United States Patent
Matsumoto

(10) Patent No.: US 9,648,212 B2
(45) Date of Patent: May 9, 2017

(54) IMAGE PROCESSING DEVICE, IMAGE PROCESSING METHOD, AND COMPUTER PROGRAM

(71) Applicant: SAMSUNG DISPLAY CO., LTD., Yongin-si, Gyeonggi-do (KR)

(72) Inventor: Kazuhiro Matsumoto, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/051,204

(22) Filed: Feb. 23, 2016

(65) Prior Publication Data

US 2016/0248991 A1 Aug. 25, 2016

(30) Foreign Application Priority Data

Feb. 24, 2015 (JP) ................. 2015-033766

(51) Int. Cl.
H04N 5/235 (2006.01)
H04N 5/14 (2006.01)
G06T 5/00 (2006.01)

(52) U.S. Cl.
CPC ............ H04N 5/142 (2013.01); G06T 5/00 (2013.01); H04N 5/2355 (2013.01)

(58) Field of Classification Search
CPC .................................... H04N 5/142
See application file for complete search history.

(56) References Cited

U.S. PATENT DOCUMENTS 7,369,699 B1 * 5/2008 Christie ............... H04N 1/6027
382/163
2016/0117807 A1 4/2016 Matsumoto

FOREIGN PATENT DOCUMENTS

| JP | 09-050519 | 2/1997 |
| JP | H09270004 | 10/1997 |
| JP | H10198801 | 7/1998 |
| JP | 2003008935 | 1/2003 |
| JP | 2007-048104 | 2/2007 |
| JP | 2010072982 | 4/2010 |

* cited by examiner

Primary Examiner — Gary C Vieaux
(74) Attorney, Agent, or Firm — F. Chau & Associates, LLC

(57) ABSTRACT

An image processing device includes an edge strength calculation unit, and a mixing unit. The edge strength calculation unit calculates an edge strength of a pixel of interest in an input image from a stairs tone strength of the pixel of interest and a gradient of the pixel of interest, wherein the gradient is calculated from pixel values of the pixel of interest and pixels adjacent to the pixel of interest, and the stairs tone strength is indicative of differences between the gradient and a variance of the pixel of interest calculated from the pixel values of the pixel of interest and the adjacent pixels. The mixing unit calculates an illumination light component of the pixel of interest of the input image from an average value of the pixel of interest and pixel values adjacent to the pixel of interest, and a mixing ratio calculated from the edge strength.

20 Claims, 21 Drawing Sheets

IMAGE PROCESSING DEVICE, IMAGE PROCESSING METHOD, AND COMPUTER PROGRAM

CROSS-REFERENCE TO RELATED APPLICATIONS

This U.S. non-provisional patent application claims priority under 35 U.S.C. §119 from, and the benefit of, Japanese Patent Application No. 2015-033766, filed on Feb. 24, 2015, the contents of which are herein incorporated by reference in their entirety.

BACKGROUND

Embodiments of the present disclosure are directed to an image processing device, an image processing method, and an image processing program.

Imaging devices, such as digital still cameras, are widely used. A dynamic range compression technology such as high dynamic range (HDR) or backlight compensation is used in some imaging devices. Such imaging devices compress a range of one or both of a highlight area and a shadow area of an image of a subject for which a brightness range is wider than a dynamic range of an imaging element, to acquire an image.

Furthermore, a technology for improving visibility of an image having a compressed brightness range uses image processing based on retinex theory on the image to perform local dynamic range compensation. Based on retinex theory, brightness components of an input image are divided into illumination light components and reflectivity components, and the illumination light components are modulated and then combined with the reflectivity components, to obtain an output image having a locally compensated dynamic range.

Based on retinex theory, a smoothing filter can be applied to the input image to extract the illumination light components. Due to the application of the smoothing filter to the input image, an unnatural image pattern not originally present in the image, i.e., a halo phenomenon, may form in a boundary region between a subject and a background.

An $\epsilon$ filter can be applied as a smoothing filter and a value of $\epsilon$ is controlled, so that smoothing is performed while an edge is maintained. Based on an application of this smoothing filter, a boundary between a background and a subject, referred to as a "stairs tone edge", is not differentiated from a boundary in which contrast (gradation) is changed by a subject's shape, referred to as a "pattern tone edge". Therefore, for example, even if a subject is uniformly with an illumination that does not depend on the subject's shape, an edge may be maintained at a high contrast portion and the shape itself may be treated as an illumination light component. Therefore, an image free from a halo phenomenon may be obtained, but contrast may be deteriorated with respect to the subject's shape.

SUMMARY

Embodiments of the present disclosure can provide an image processing device, an image processing method, and an image processing program for differentiating a stairs tone edge from a pattern tone edge in an image to perform a nonlinear smoothing operation on the image.

An embodiment of the inventive concept provides an image processing device including an edge strength calculation unit that calculates an edge strength of a pixel of interest in an input image from a stairs tone strength of the pixel of interest and a gradient of the pixel of interest, wherein the gradient is calculated from pixel values of the pixel of interest and pixels adjacent to the pixel of interest, and the stairs tone strength is indicative of differences between the gradient and a variance of the pixel of interest calculated from the pixel values of the pixel of interest and the adjacent pixels, and a mixing unit that calculates an illumination light component of the pixel of interest of the input image from the pixel value of the pixel of interest, an average value of the pixel values of the pixels adjacent to the pixel of interest, and a mixing ratio of the pixel of interest calculated from the edge strength.

In an embodiment, the image processing device may include a variance calculation unit that calculates the average value from the pixel values of the pixel of interest and adjacent pixels within a predetermined range of the pixel of interest, and calculates the variance from the average value.

In an embodiment, the image processing device may include a gradient calculation unit that calculates the gradient of the pixel of interest from pixel values of the of the pixel of interest and adjacent pixels within a predetermined range of the pixel of interest.

In an embodiment, the image processing device may include a mixing ratio calculation unit that calculates the mixing ratio of the pixel of interest from the edge strength of the pixel of interest.

In an embodiment, the mixing ratio $K_E$ is calculated from $$f_E(K_G) = \begin{cases} 1 & \ldots K_G < th_1 \\ \min & \ldots K_G \geq th_2 \\ \dfrac{(1-\min)(th_2 - K_G)}{th_2 - th_1} + \min & \ldots \text{otherwise} \end{cases},$$

wherein $K_G$ is the edge strength, $f_E(K_G)$ is a function that converts the edge strength $K_G$ into the mixing ratio $K_E$, $th_1$ and $th_2$ are threshold values of the edge strength, wherein $th_1 < th_2$, and min is a preset constant greater than zero.

In an embodiment, the stairs tone strength $K_S(x, y)$ of the pixel of interest is calculated from $$K_S(x, y) = \begin{cases} \nabla^2(x, y)/\sigma^2(x, y) & \ldots \nabla^2(x, y)/\sigma^2(x, y) \leq 1 \\ 1 & \ldots \text{otherwise} \end{cases},$$

wherein $\nabla^2(x, y)$ is the gradient of the pixel of interest, and $\sigma^2(x, y)$ is the variance of the pixel of interest, and the edge strength $K_G(x, y)$ of the pixel of interest is calculated from $K_G(x, y) = \alpha \nabla^2(x, y) K_S$, wherein $\alpha$ is a predetermined constant.

In an embodiment, the mixing unit may include a first multiplication unit that multiplies the pixel value of the pixel of interest by a first coefficient based on the mixing ratio, a second multiplication unit that multiplies the average value by a second coefficient based on the mixing ratio, a subtraction unit that that calculates that first coefficient by subtracting the mixing ratio from one, and an addition unit that adds an output of the first multiplication unit to an output of the second multiplication unit.

In an embodiment, the image processing device may include a division unit that receives the illumination light component from the illumination light generation unit and that calculates a reflectivity component of the input image by dividing the input image by the illumination light component, an illumination light modulation unit that locally modulates the illumination light component to generate a new illumination light component, and a multiplication unit that multiplies the reflectivity component received from the division unit by the new illumination light component received from the illumination light modulation unit to generate a brightness component.

In an embodiment of the inventive concept, an image processing method includes calculating an edge strength of a pixel of interest in an input image from a stairs tone strength of the pixel of interest and a gradient of the pixel of interest, wherein the gradient is calculated from pixel values of the pixel of interest and pixels adjacent to the pixel of interest, and the stairs tone strength is indicative of differences between the gradient and a variance of the pixel of interest calculated from the pixel values of the pixel of interest and the adjacent pixels, and calculating an illumination light component of the pixel of interest of the input image from the pixel value of the pixel of interest, an average value of the pixel values of the pixels adjacent to the pixel of interest, and a mixing ratio calculated from the edge strength.

In an embodiment, the average value may be calculated from the pixel values of the pixel of interest and adjacent pixels within a predetermined range of the pixel of interest, and the variance is calculated from the average value.

In an embodiment, the gradient may be calculated from pixel values of the pixel of interest and adjacent pixels within a predetermined range of the pixel of interest.

In an embodiment, the mixing ratio $K_E$ of the pixel of interest may be calculated from the edge strength of the pixel of interest using $$f_E(K_G) = \begin{cases} 1 & \ldots K_G < th_1 \\ \min & \ldots K_G \geq th_2 \\ \frac{(1-\min)(th_2 - K_G)}{th_2 - th_1} + \min & \ldots \text{otherwise} \end{cases},$$

wherein $K_G$ is the edge strength, $f_E(K_G)$ is a function that converts the edge strength $K_G$ into the mixing ratio $K_E$, $th_1$ and $th_2$ are threshold values of the edge strength, wherein $th_1 < th_2$, and min is a preset constant greater than zero.

In an embodiment the stairs tone strength $K_S$ (x, y) of the pixel of interest may be calculated from $$K_S(x, y) = \begin{cases} \nabla^2(x, y)/\sigma^2(x, y) & \ldots \nabla^2(x, y)/\sigma^2(x, y) \leq 1 \\ 1 & \ldots \text{otherwise} \end{cases},$$

wherein $\nabla^2(x, y)$ is the gradient of the pixel of interest, and $\sigma^2(x, y)$ is the variance of the pixel of interest, and the edge strength $K_G(x, y)$ of the pixel of interest is calculated from $K_G(x, y) = \alpha \cdot \nabla^2 (x, y) \cdot K_S$, wherein $\alpha$ is a predetermined constant.

In an embodiment, in the illumination light component L(x, y) of the pixel of interest may be calculated from $L(x,y)=(1-K_E)\cdot I(x,y)+K_E\cdot A(x, y)$, wherein $K_E$ is the mixing ratio, I(x, y) is the pixel value of the input image at the pixel of interest, and A(x, y) is the average value of the pixel of interest.

In an embodiment of the inventive concept, a non-transitory program storage device readable by a computer, tangibly embodying a program of instructions executed by the computer to perform the method steps for processing an image, the method comprising the steps of calculating an edge strength of a pixel of interest in an input image from a stairs tone strength of the pixel of interest and a gradient of the pixel of interest, wherein the gradient is calculated from pixel values of the pixel of interest and pixels adjacent to the pixel of interest, and the stairs tone strength is indicative of differences between the gradient and a variance of the pixel of interest calculated from the pixel values of the pixel of interest and the adjacent pixels, and calculating an illumination light component of the pixel of interest of the input image from the pixel value of the pixel of interest, an average value of the pixel value of pixels adjacent to the pixel of interest, and a mixing ratio of the pixel of interest calculated from the edge strength.

In an embodiment, the average value may be calculated from the pixel values of the pixel of interest and adjacent pixels within a predetermined range of the pixel of interest, and the variance is calculated from the average value.

In an embodiment, the gradient may be calculated from pixel values of the pixel of interest and adjacent pixels within a predetermined range of the pixel of interest.

In an embodiment, the mixing ratio $K_E$ of the pixel of interest may be calculated from the edge strength of the pixel of interest using $$f_E(K_G) = \begin{cases} 1 & \ldots K_G < th_1 \\ \min & \ldots K_G \geq th_2 \\ \frac{(1-\min)(th_2 - K_G)}{th_2 - th_1} + \min & \ldots \text{otherwise} \end{cases},$$

wherein $K_G$ is the edge strength, $f_E(K_G)$ is a function that converts the edge strength $K_G$ into the mixing ratio $K_e$, $th_1$ and $th_2$ are threshold values of the edge strength, wherein $th_1 < th_2$, and min is a preset constant greater than zero.

In an embodiment, the stairs tone strength $K_S$ (x, y) of the pixel of interest may be calculated from $$K_s(x, y) = \begin{cases} \nabla^2(x, y)/\sigma^2(x, y) & \ldots \nabla^2(x, y)/\sigma^2(x, y) \leq 1 \\ 1 & \ldots \text{otherwise} \end{cases}$$

wherein $\nabla^2(x, y)$ is the gradient of the pixel of interest, and $\sigma^2(x, y)$ is the variance of the pixel of interest, and the edge strength $K_G(x, y)$ of the pixel of interest is calculated from $K_G(x, y)=\alpha \cdot \nabla^2(x, y) \cdot K_S$, wherein $\alpha$ is a predetermined constant.

In an embodiment, in the illumination light component L(x, y) of the pixel of interest may be calculated from $L(x,y)=(1-K_E)\cdot I(x, y)+K_E\cdot A(x,y)$, wherein $K_E$ is the mixing ratio, I(x, y) is the pixel value of the input image at the pixel of interest, and A(x, y) is the average value of the pixel of interest.

DETAILED DESCRIPTION

Figure 1:
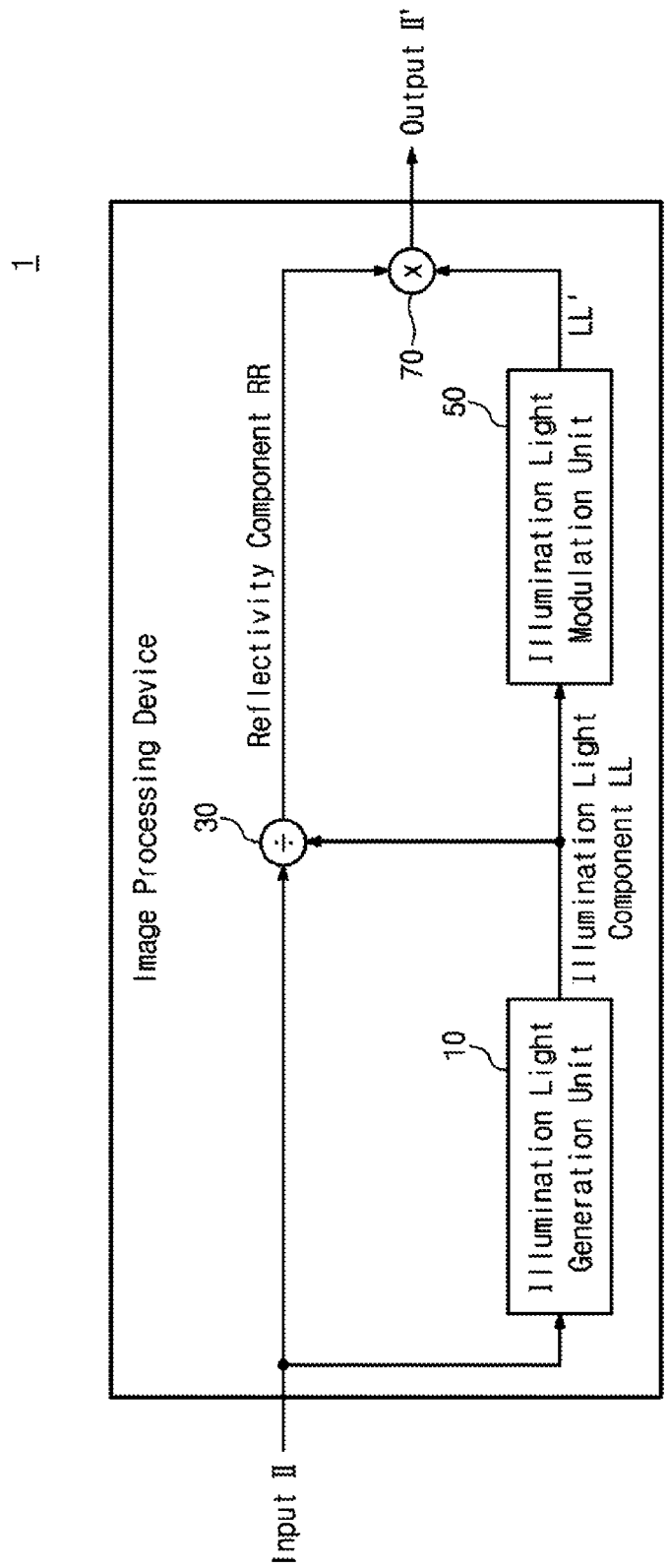
FIG. 1 is a block diagram of an exemplary configuration of an image processing device according to an embodiment of the inventive concept.

Exemplary embodiments of the inventive concept will be described in detail with reference to the accompanying drawings. In the description and the drawings, elements that have substantially the same configuration may be referred to by the same reference numeral to avoid overlapping descriptions.

1. Overview: Image Processing Device Based on Retinex Theory

Image processing based on retinex theory is briefly described below to assist with an understanding of an image processing device according to an embodiment of the inventive concept.

In general, when an image of a subject is acquired by an imaging device such as a digital camera, a brightness range of natural light on the subject may exceed a dynamic range of an imaging element in the imaging device. Therefore, some imaging devices employ a dynamic range compression technology such as high dynamic range (HDR) or backlight compensation to acquire an image of a subject of which a brightness range is wider than a dynamic range of an imaging element. Imaging devices that use dynamic range compression technology compress the range of one or both of a highlight area and a shadow area of an acquired image, thereby enabling acquisition of an image of a subject for which a brightness range is wider than a dynamic range of an imaging element.

According to a technology for improving image visibility by compressing a dynamic range, local dynamic range compensation based on retinex theory can be performed as an image processing operation.

In detail, according to retinex theory, light in an image can be regarded as a product of an illumination light component and a reflectivity component. Letting the illumination light component be L and the reflectivity component be R, a brightness I of an input image can be expressed as Equation (1), below:

$$I = L \times R. \quad (1)$$

Hereinafter, for convenience, I, L and R are respectively referred to as II, LL and RR.

When local dynamic range compensation based on retinex theory is performed, an image processing device separately processes the illumination light component LL and the reflectivity component RR from the brightness component II of the input image. Hereinafter, the brightness II of the input image may be simply referred to as an "input II".

An exemplary configuration of an image processing device for performing local dynamic range compensation based on retinex theory according to an embodiment of the inventive concept will be described with reference to FIG. 1. FIG. 1 is a block diagram of an exemplary configuration of an image processing device according to an embodiment of the inventive concept.

As illustrated in FIG. 1, an image processing device 1 according to a present embodiment includes an illumination light generation unit 10, a division unit 30, an illumination light modulation unit 50, and a multiplication unit 70.

The illumination light generation unit 10 generates the illumination light component LL from the input II. In detail, the illumination light generation unit 10 performs a smoothing operation on the input II, for example, by applying a smoothing filter, to generate the illumination light component LL from the input II. Furthermore, the illumination light generation unit 10 outputs, to the division unit 30 and the illumination light modulation unit 50, the generated illumination light component LL. The illumination light generation unit 10 will be described in more detail below.

The division unit 30 generates the reflectivity component RR from the input II. In detail, the division unit 30 receives the illumination light component LL from the illumination light generation unit 10, and calculates the reflectivity component RR by dividing the input II by the illumination light component LL on the basis of Equation (1). The division unit 30 outputs the reflectivity component RR to the multiplication unit 70.

The illumination light modulation unit 50 receives, from the illumination light generation unit 10, the illumination light component LL generated from the input II. The illumination light modulation unit 50 locally modulates the illumination light component LL to generate a new illumination light component LL'. Furthermore, the illumination light modulation unit 50 outputs the new illumination light component LL' to the multiplication unit 70.

The multiplication unit 70 multiplies the reflectivity component RR received from the division unit 30 by the new illumination light component LL' received from the illumination light modulation unit 50, i.e., the new illumination light component LL' obtained by locally modulating the illumination light component LL. The multiplication unit 70 outputs as an output image, to a predetermined external device, an image based on a brightness component II' generated by recombining the reflectivity component RR and the illumination light component LL'.

As described above, the image processing device 1 generates and outputs an output image obtained by compensating a dynamic range of an input image.

2. An Embodiment

2.1. Overview

An illumination light generation unit 10 according to an embodiment of the inventive concept will be described.

As described above, the illumination light generation unit 10 performs a smoothing operation on the input II by applying a smoothing filter to generate the illumination light component LL from the input II. Due to the smoothing operation performed on the input II, a halo phenomenon may occur. A halo phenomenon occurs when a large brightness change at a subject-background boundary is smoothed by the smoothing operation and contrast of a portion adjacent to the boundary is reduced.

Figure 2:
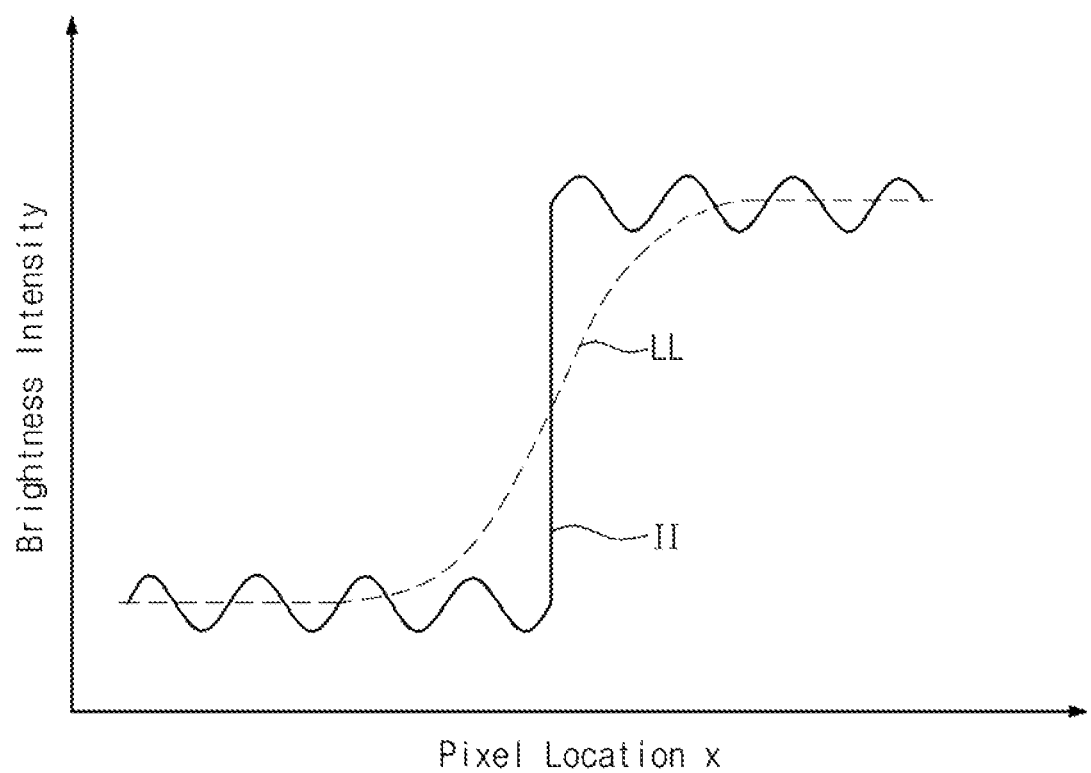
FIG. 2 illustrates an exemplary result of a smoothing operation performed by an illumination light generation unit.

For example, FIG. 2 illustrates an exemplary result of a smoothing operation performed by the illumination light generation unit 10. In detail, FIG. 2 illustrates a change in brightness intensity for each pixel of an image with respect to each of an input and an output when the smoothing operation is performed on a subject-background boundary. Herein, the brightness intensity may represent, for example, a pixel value, a luminance value, or a lightness value. In the description below, the term "brightness intensity" may correspond to any one of the forgoing values. In the graph of FIG. 2, the horizontal axis represents a pixel location in an image and the vertical axis represents the brightness intensity. Furthermore, in the graph of FIG. 2, reference sign II represents a brightness component of an input image, and reference sign LL represents an output, i.e., a generated illumination light component, when the smoothing operation is performed on the input II.

As illustrated in FIG. 2, once the smoothing operation is performed at the subject-background boundary in the input II, the illumination light component LL is generated in which a rapid brightness change at the boundary has been reduced. As the rapid brightness change between the subject and the background is reduced, the contrast of the subject-background boundary is reduced, which may induce a halo phenomenon.

Figure 3:
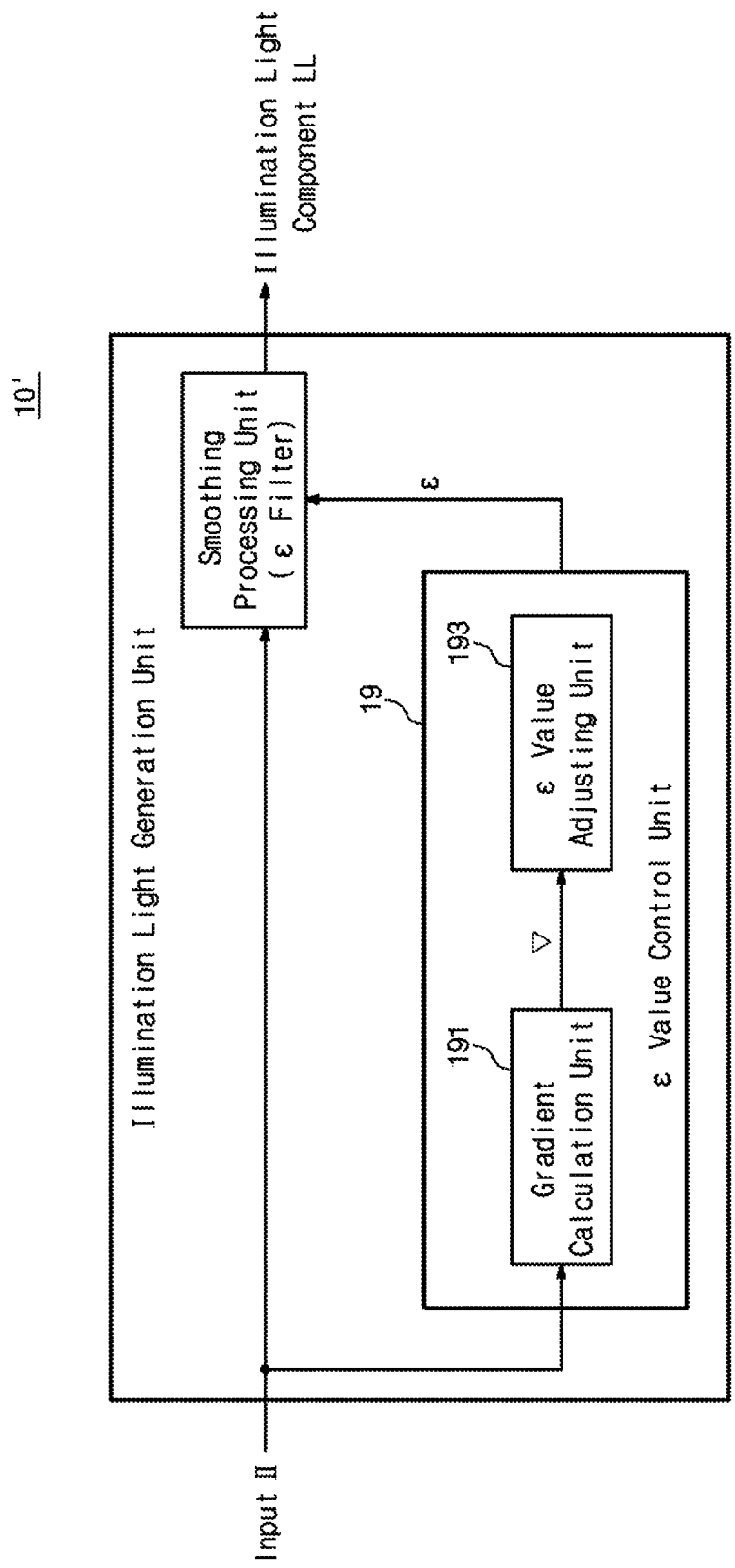
FIG. 3 is a block diagram of an exemplary configuration of an illumination light generation unit according to a comparative example.

As a comparative example, an example of the illumination light generation unit 10 which generates the illumination light component LL without generating a halo phenomenon will be described with reference to FIG. 3. FIG. 3 is a block diagram of an exemplary configuration of an illumination light generation unit according to a comparative example. An illumination light generation unit according to a comparative example is referred to reference number 10' to differentiate it from the illumination light generation unit 10 according to a present embodiment.

In the illumination light generation unit 10' according to a comparative example illustrated in FIG. 3, an ϵ filter is used for performing a smoothing operation, and an ϵ value of the ϵ filter is controlled to perform the smoothing operation while maintaining an edge with respect to the input II.

In detail, as illustrated in FIG. 3, the illumination light generation unit 10' according to a comparative example includes a smoothing processing unit 11 and an ϵ value control unit 19. The smoothing processing unit 11 corresponds to the ϵ filter. The ϵ value control unit 19 includes a gradient calculation unit 191 and an ϵ value adjusting unit 193.

The gradient calculation unit 191 calculates a gradient ∇ for each pixel of interest on the basis of the brightness intensity of pixels adjacent to the pixel of interest, in which each pixel of the input image II is sequentially processed as the pixel of interest.

As an example of a method for calculating the gradient ∇ by the gradient calculation unit 191, a primary differential filter, i.e., a high-pass filter, can be applied as expressed by Equation (2), below:

$$|\nabla|(x,y)=|I(x-n,y)-I(x+n,y)|+|I(x,y-n)-I(x,y+n)| \quad (2)$$

In Equation (2), n denotes an operator length for specifying an adjacent pixel. Furthermore, I(x−n, y) and I(x+n, y) denote a brightness component of an adjacent pixel positioned in an x direction, such as a horizontal direction, with respect to a pixel of interest, for an operator length of n. Likewise, I(x, y−n) and I(x, y+n) denote a brightness component of an adjacent pixel positioned in a y direction, such as a vertical direction, with respect to a pixel of interest, for an operator length of n. In addition, a tap number is 3 when the operator length n=1, and the tap number is 5 when the operator length n=2.

As another example, the gradient calculation unit 191 may calculate the gradient using a band limiting filter as expressed by Equation (3) below:

$$|\nabla|(x, y) = \left|\sum_{j=-n}^{+n}[I(x-n, y+j) - I(x+n, y+j)]\right| + \left|\sum_{i=-n}^{+n}[I(x+i, y-n) - I(x+i, y+n)]\right| \quad (3)$$

As described above, for each pixel of interest, the gradient calculation unit 191 calculates the gradient ∇ on the basis of a brightness intensity of pixels adjacent to the pixel of interest. Furthermore, the gradient calculation unit 191 outputs, to the ϵ value adjusting unit 193, the gradient ∇ calculated for each pixel of interest.

The ϵ value adjusting unit 193 receives, from the gradient calculation unit 191, the gradient ∇ calculated for each pixel of interest of an input image. The ϵ value adjusting unit 193 considers the gradient ∇, or more specifically, an absolute value of the gradient ∇, received for each pixel of interest to be an edge strength $K_G$ of each pixel of interest. The edge strength $K_G(x,y)$ of the pixel of interest can be derived from Equation (4) below, letting the coordinates of the pixel of interest be (x,y) and the gradient of the pixel of interest be ∇(x,y):

$$K_G(x,y)=|\nabla(x,y)| \quad (4)$$

Figure 4:
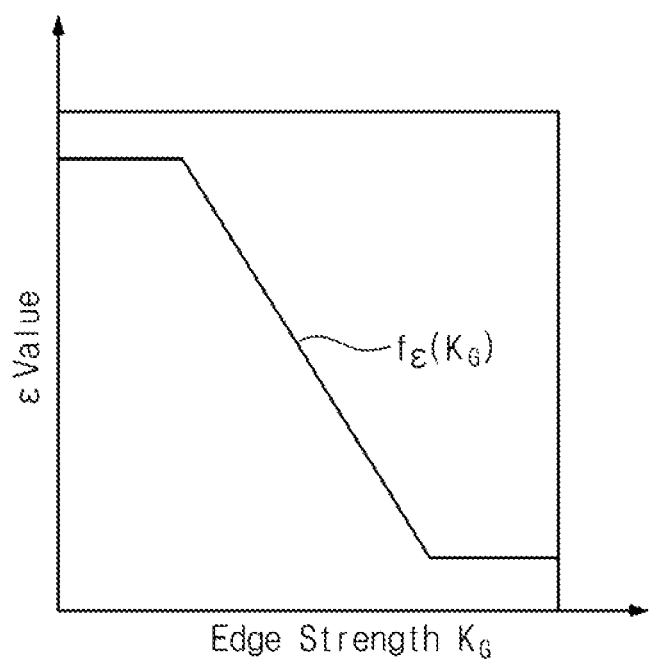
FIG. 4 illustrates an exemplary function that performs edge strength-ϵ value conversion by an ϵ value adjusting unit.

Furthermore, the ϵ value adjusting unit 193 converts the edge strength $K_G$ into the ϵ value to perform edge strength-ϵ value conversion, so that the ϵ value decreases as the edge strength $K_G$ increases, or the ϵ value increases as the edge strength $K_G$ decreases. For example, FIG. 4 illustrates an example of a function fϵ($K_G$) for performing edge strength-ϵ value conversion by the ϵ value adjusting unit 193.

Accordingly, the ϵ value adjusting unit 193 calculates, for each pixel of interest, the ϵ value from the edge strength $K_G$ of the pixel of interest, and outputs the calculated ϵ value to the smoothing processing unit 11.

The smoothing processing unit 11 receives, from the ϵ value adjusting unit 193, the ϵ value calculated for each pixel of interest of an input image, and applies an ϵ filter to the pixel of interest and pixels adjacent thereto based on the acquired ϵ value. As described above, the smoothing processing unit 11 performs a smoothing operation by applying the ϵ filter to the input Il, and outputs as the illumination light component LL a brightness component obtained by performing the smoothing operation.

By virtue of the above-described configuration, the illumination light generation unit 10' according to a comparative example performs a nonlinear smoothing operation on the input Il to reduce the smoothing effect for an edge portion to maintain the edge, but increases the smoothing effect for portions other than an edge. In this manner, the illumination light generation unit 10' according to a comparative example can generate the illumination light component LL without generating a halo phenomenon.

According to the illumination light generation unit 10' according to a comparative example, a subject-background boundary, also referred to as a "stairs tone edge" below, is not substantially differentiated from a boundary in which the contrast (gradation) is changed by the subject's shape, also referred to as a "pattern tone edge" below. Therefore, the illumination light generation unit 10' equally calculates an edge strength $K_GG$ without differentiating a stairs tone edge from a pattern tone edge, and performs a smoothing operation according to the edge strength $K_G$.

Figure 5:
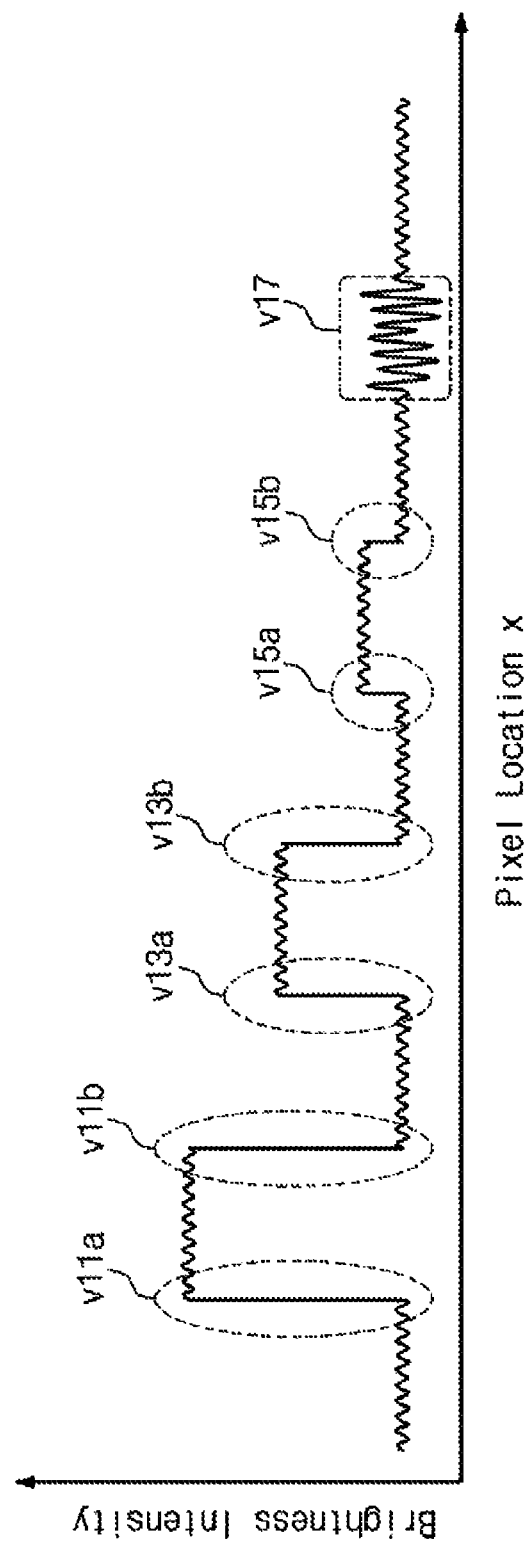
FIG. 5 illustrates an example of an input II.

For example, FIG. 5 illustrates an example of an input II, more specifically, an example of changes in brightness intensities of pixels of an input image. For ease of description, FIG. 5 illustrates changes in brightness intensities of pixels of an input image with respect to an x direction, such as a horizontal direction, of the input image. That is, the horizontal axis of the graph of FIG. 5 indicates a pixel location in the input image with respect to the x direction. Furthermore, the vertical axis of the graph of FIG. 5 indicates a brightness intensity of each pixel.

Figure 6:
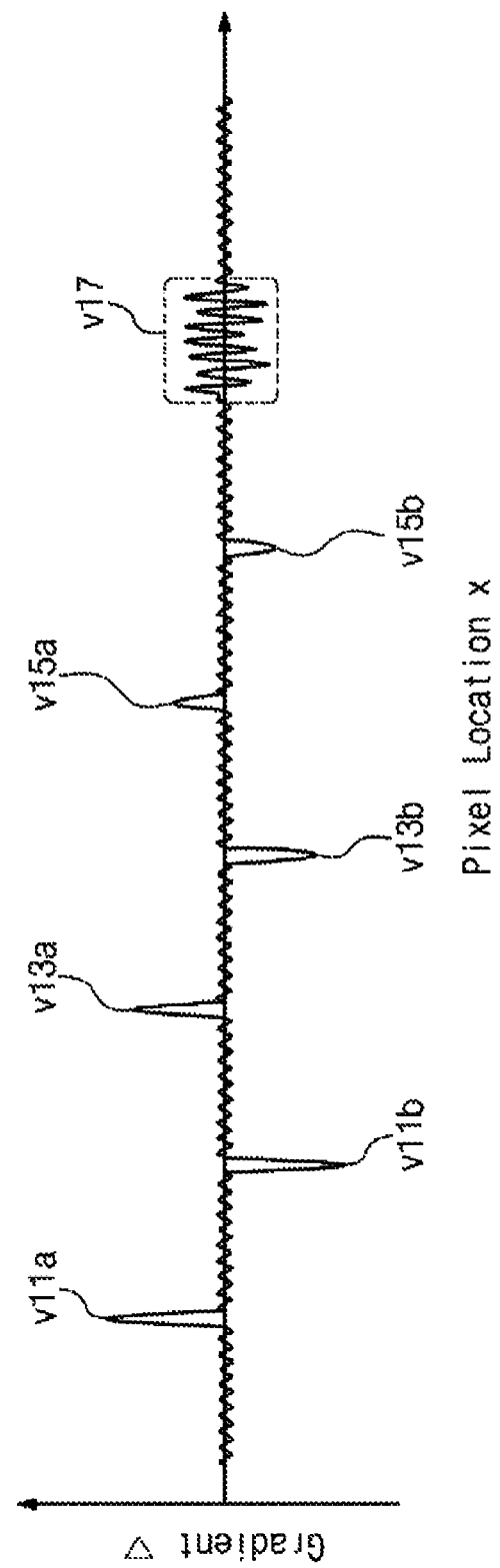
FIG. 6 is a graph that illustrates a change in a gradient for each pixel of an input image when a gradient is calculated by applying a primary differential filter to the input illustrated in FIG. 5.

FIG. 6 illustrates an example of a change in the gradient ∇ for each pixel of the input image when the gradient ∇ is calculated by applying a primary differential filter to the input II illustrated in FIG. 5. That is, the horizontal axis of the graph of FIG. 6 corresponds to the horizontal axis of the graph of FIG. 5 and indicates a pixel location in the input image with respect to the x direction. Furthermore, the vertical axis of the graph of FIG. 6 indicates the gradient ∇ calculated for each pixel.

In FIG. 5, portions v11a, v11b, v13a, v13b, v15a, and v15b represent portions of the input image in which contrast changes due to a stairs tone edge. The portion v17 represents a portion in which contrast changes due to a pattern tone edge. Furthermore, in FIG. 6, the portions v11a, v11b, v13a, v13b, v15a, v15b, and v17 correspond to the same locations of the input image indicated by the same reference numbers in FIG. 5.

In FIG. 6, stairs tone edges v15a and v15b and a pattern tone edge v17b have substantially the same gradient ∇ value. Therefore, in the case where the gradient ∇ is an edge $K_G$, the illumination light generation unit 10' does not substantially differentiate the stairs tone edges v15a and v15b from the pattern tone edge v17b.

Here, a portion where contrast changes due to a subject's shape, i.e., a portion of a pattern tone, can be regarded as being uniformly illuminated regardless of the shape, and, in some cases, the pattern tone portion can undergo a smoothing operation without maintaining an edge. However, the illumination light generation unit 10' according to a comparative example maintains not only a stairs tone edge but also a pattern tone edge. Therefore, when an input image is processed by the illumination light generation unit 10' according to a comparative example, a blurred output image may be output due to the subject's contrast being compressed by a smoothing operation.

The illumination light generation unit 10 according to a present embodiment can differentiate a stairs tone edge from a pattern tone edge in an input image, thereby enabling nonlinear smoothing processing for the input image. The illumination light generation unit 10 according to a present embodiment is described in more detail below.

2.2. Function Configuration

Figure 7:
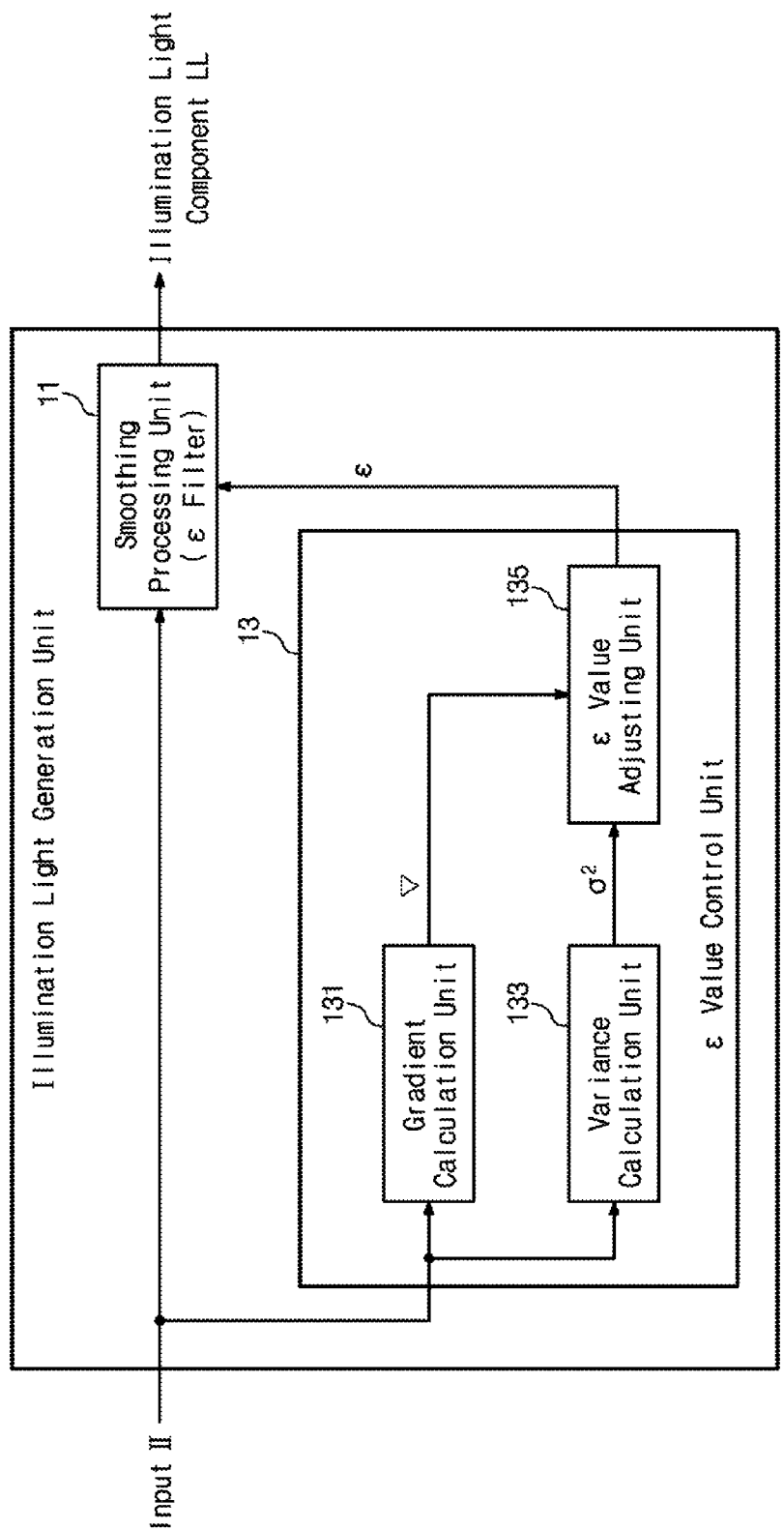
FIG. 7 is a block diagram of an exemplary configuration of an illumination light generation unit according to an embodiment of the inventive concept.

An exemplary configuration of the illumination light generation unit 10 according to an embodiment of the inventive concept will be described with reference to FIG. 7. FIG. 7 is a block diagram of an exemplary configuration of the illumination light generation unit 10 according to a present embodiment.

As illustrated in FIG. 7, the illumination light generation unit 10 according to a present embodiment includes a smoothing processing unit 11 and an ϵ value control unit 13. Since the smoothing processing unit 11 is the same as that of the illumination light generation unit 10' described with respect to FIG. 3, the smoothing processing unit 11 is not described in detail below. The ϵ value control unit 13 includes a gradient calculation unit 131, a variance calculation unit 133, and an ϵ value adjusting unit 135.

The gradient calculation unit 131 is the same as the gradient calculation unit 191 of the illumination light generation unit 10' according to a comparative example as described above. That is, the gradient calculation unit 131 calculates a gradient ∇ for each pixel of interest from the brightness intensities of the pixels adjacent to the pixel of interest, wherein each pixel of the input image 11 is sequentially processed as the pixel of interest.

Furthermore, the gradient calculation unit 131 calculates the gradient ∇ for each pixel of interest by calculating a convolution integral using a filter operator. Equation (5), below, is an example of expressing the primary differential filter of Equation (2) or (3) by a convolution integral.

$$f'(x) = \nabla f(x) = W \otimes X, \quad (5)$$

In Equation (5), W denotes an operator for calculating the gradient ∇, also referred to as a "gradient operator", below. Equation (6), below, is an example of the gradient operator W when an operator length n=1:

$$W = [-1 \ 0 \ 1] \cdot \frac{1}{2}. \quad (6)$$

For another example, Equation (7) below is an example of the gradient operator W when the operator length n=2:

$$W = [\,-1 \quad -1 \quad 0 \quad 1 \quad 1\,] \cdot \frac{1}{4}. \tag{7}$$

The gradient operators of Equations (6) and (7) are merely examples, and the operator length n and the operator coefficients may change in other embodiments.

As described above, for each pixel of interest, the gradient calculation unit 131 calculates the gradient ∇ from the brightness intensities of pixels adjacent to the pixel of interest. Furthermore, the gradient calculation unit 131 outputs, to the ϵ value adjusting unit 135, the gradient ∇ calculated for each pixel of interest.

The variance calculation unit 133 calculates a variance $\sigma^2$ for each pixel of interest from the brightness intensities of the pixel of interest and of pixels adjacent to the pixel of interest, where each pixel of the input image II is sequentially processed as the pixel of interest.

Here, the variance $\sigma^2(x, y)$ of the pixel of interest is calculated using Equation (8) below, letting the coordinates of the pixel of interest be (x, y) and the brightness intensity of a pixel located at the coordinates (x-i, y-j) be $I_{x-j,y-i}$:

$$\sigma^2(x, y) = \frac{1}{(2m+1)^2} \sum_{i=-m}^{m} \sum_{j=-m}^{m} (I_{x-i,y-j} - \bar{I})^2 \tag{8}$$

$$\bar{I} = \frac{1}{(2m+1)^2} \sum_{i=-m}^{m} \sum_{j=-m}^{m} I_{x-i,y-j}.$$

Equation (8) may be expanded as expressed by Equation (9), below:

$$\begin{aligned}\sigma^2(x, y) &= \frac{1}{(2m+1)^2} \sum_{i=-m}^{m} \sum_{j=-m}^{m} (I_{x-i,y-j} - \bar{I})^2 \\ &= \frac{1}{(2m+1)^2} \sum_{i=-m}^{m} \sum_{j=-m}^{m} \left(I_{x-i,y-j}^2 - 2I_{x-i,y-j} \cdot \bar{I} + \bar{I}^2\right) \\ &= \frac{1}{(2m+1)^2} \sum_{i=-m}^{m} \sum_{j=-m}^{m} I_{x-i,y-j}^2 - \frac{1}{(2m+1)^2} \\ &\quad \sum_{i=-m}^{m} \sum_{j=-m}^{m} 2I_{x-i,y-j} \cdot \bar{I} + \frac{1}{(2m+1)^2} \sum_{i=-m}^{m} \sum_{j=-m}^{m} \bar{I}^2 \\ &= \frac{1}{(2m+1)^2} \sum_{i=-m}^{m} \sum_{j=-m}^{m} I_{x-i,y-j}^2 - \frac{2\bar{I}}{(2m+1)^2} \\ &\quad \sum_{i=-m}^{m} \sum_{j=-m}^{m} I_{x-i,y-j} + \bar{I}^2 \\ &= \frac{1}{(2m+1)^2} \sum_{i=-m}^{m} \sum_{j=-m}^{m} I_{x-i,y-j}^2 - 2\bar{I}\bar{I} + \bar{I}^2 \\ &= \frac{1}{(2m+1)^2} \sum_{i=-m}^{m} \sum_{j=-m}^{m} I_{x-i,y-j}^2 - \bar{I}^2\end{aligned} \tag{9}$$

Figure 8:
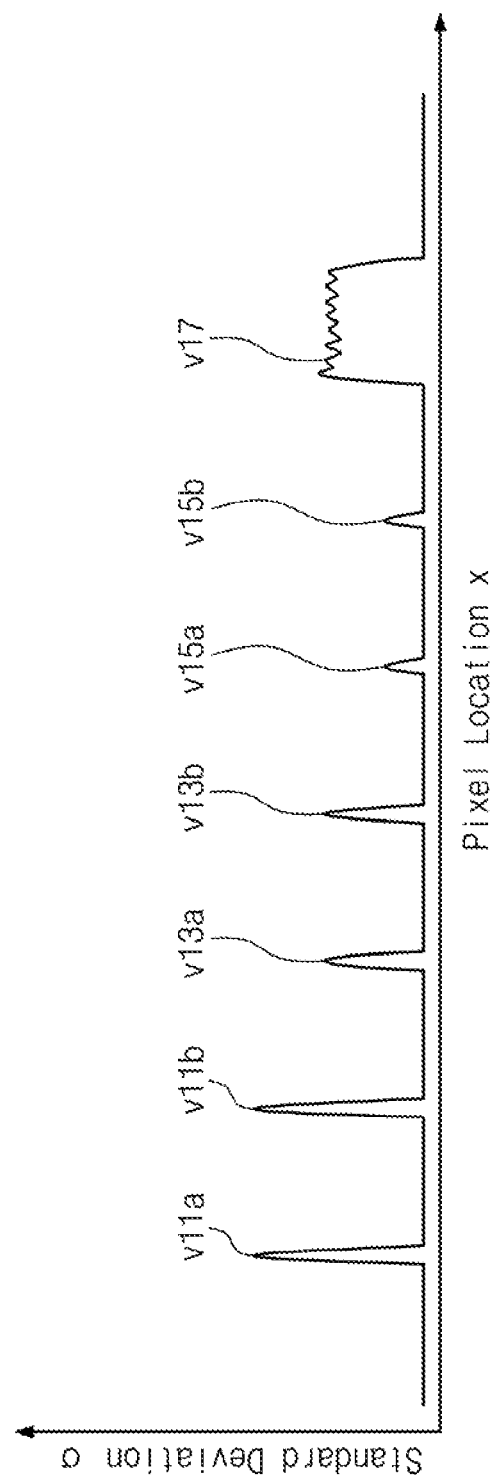
FIG. 8 is a graph that illustrates an example of a change in a standard deviation based on a variation for each pixel of an input image calculated on the basis of the input illustrated in FIG. 5.

FIG. 8 is a graph that illustrates a change in a standard deviation σ based on the variation $\sigma^2$ calculated for each pixel of the input image II of FIG. 5. Furthermore, to match units with respect to the gradient ∇ for each pixel illustrated in FIG. 6, the horizontal axis of the graph of FIG. 8 corresponds to the horizontal axes of the graphs of FIGS. 5 and 6 and indicates a pixel location in the input image with respect to the x direction. Furthermore, the vertical axis of the graph of FIG. 8 indicates the standard deviation σ calculated for each pixel. The standard deviation σ is calculated as the square root of the variance $\sigma^2$. The variance calculation unit 133 may calculate the standard deviation σ instead of the variance $\sigma^2$.

As described above, for each pixel of interest, the variance calculation unit 133 calculates the variance $\sigma^2$ from the brightness intensities of the pixel of interest and pixels adjacent to the pixel of interest. Furthermore, the variance calculation unit 133 outputs, to the ϵ value adjusting unit 135, the variance $\sigma^2$ for each pixel of interest.

The ϵ value adjusting unit 135 receives, from the gradient calculation unit 131, the gradient ∇ for each pixel of interest. Furthermore, the ϵ value adjusting unit 135 receives, from the variance calculation unit 133, the variance $\sigma^2$ for each pixel of interest.

The ϵ value adjusting unit 135 according to a present embodiment will be described by comparing the change of the gradient ∇ for each pixel illustrated in FIG. 6 with the change of the standard deviation σ, or, in other words, the variance $\sigma^2$, for each pixel illustrated in FIG. 8.

As described above with reference to FIG. 6, when considering the gradient ∇ for each pixel, the stairs tone edges v15a and v15b and the pattern tone edge v17b have approximately the same gradient ∇ value, and are thus not substantially differentiated from each other.

Alternatively, when considering the standard deviation σ for each pixel, as illustrated in FIG. 8, the stairs tone edges v15a and v15b and the pattern tone edge v17b have different standard deviation σ values, and thus can be differentiated from each other. In addition, the stairs tone edges v13a and v13b and the pattern tone edge v17 have approximately the same standard deviation σ value, and are thus not substantially differentiated from each other.

By comparing FIGS. 6 and 8, it may be seen that the gradient ∇ differs from the standard deviation σ at portions where a stairs tone edge is not substantially differentiated from a pattern tone edge. This difference results from characteristic differences between the gradient ∇ and the standard deviation σ. The ϵ value adjusting unit 135 according to a present embodiment can differentiate a stairs tone edge from a pattern tone edge using the characteristic differences.

In detail, the gradient ∇ indicates a difference between pixels adjacent to or near a pixel of interest. In Equation (8), the standard deviation σ indicates a change in a range defined by an operator length m. Ideally, regarding a stairs tone edge, a maximum value (peak) of the standard deviation σ tends to have approximately the same value as a maximum value of an absolute gradient ∇ value. However, regarding a pattern tone edge, the standard deviation σ tends to have a larger value than that of the absolute gradient ∇ value. Therefore, the ϵ value adjusting unit 135 according to a present embodiment calculates a discrepancy between the gradient ∇ and the standard deviation σ as a stairs tone strength $K_S$, and differentiates a stairs tone edge from a pattern tone edge using the stairs tone strength $K_S$.

For example, letting the coordinates of a pixel of interest be (x, y), the stairs tone strength $K_S(x, y)$ of the pixel of interest is calculated from the gradient ∇(x, y) and the standard deviation σ(x, y) of the pixel of interest using Equation (10) below:

$$K_S(x, y) = \frac{k_\nabla \cdot |\nabla(x, y)|}{k_\sigma \cdot \sigma(x, y)} = k \cdot \frac{|\nabla(x, y)|}{\sigma(x, y)}. \quad (10)$$

In Equation (10), $k_\nabla$ and $k_\sigma$ are compensation (or normalization) coefficients for the gradient $\nabla(x, y)$ and the standard deviation $\sigma(x, y)$ respectively and are determined so that a ratio between the absolute value of the $\nabla(x, y)$ and the absolute value of the standard deviation $\sigma(x, y)$ is 1. Furthermore, the compensation coefficient k represents the ratio of the coefficients $k_\nabla$ and $k_\sigma$.

The coefficients $k_\nabla$ and $k_\sigma$ may be pre-calculated integers. For another example, based on a plurality of ideal stairs tone edges with different brightness intensities, a function for compensating $|\nabla|/(\sigma)$ may be pre-calculated, and the function may be determined with the compensation coefficients $k_\nabla$ and $k_\sigma$.

Equation (10) can be generalized to express the stairs tone strength $K_S$ as Equation (11), below:

$$K_S = \frac{k_\nabla \cdot |\nabla|}{k_\sigma \cdot \sigma} = k \cdot \frac{|\nabla|}{\sigma}. \quad (11)$$

Here, the stairs tone strength $K_S$ has a value of 1 or less, and, as the stairs tone strength $K_S$ approaches 1, brightness changes more rapidly in the vicinity of a corresponding pixel of interest. That is, as the stairs tone strength $K_S$ approaches 1, the corresponding pixel of interest is more likely to correspond to a stairs tone edge.

The above-disclosed equation for calculating the stairs tone strength $K_S$ is merely an example. A method of calculating the stairs tone strength $K_S$ is not limited to the above example, as long as the method indicates a degree of discrepancy between the gradient $\nabla$ and the standard deviation $\sigma$ (or the variance $\sigma^2$).

As a specific example, the $\epsilon$ value adjusting unit 135 can calculate the stairs tone strength $K_S$ from the discrepancy between the square of the gradient $\nabla$ and the variance $\sigma^2$. In this case, letting the coordinates of a pixel of interest be (x, y), the stairs tone strength $K_S(x, y)$ of the pixel of interest can be calculated from the gradient $\nabla(x, y)$ and the standard deviation $\sigma(x, y)$ of the pixel of interest as expressed by Equation (12) below:

$$K_S(x, y) = \frac{k_\nabla \cdot \nabla^2(x, y)}{k_\sigma \cdot \sigma^2(x, y)} = k \cdot \frac{\nabla^2(x, y)}{\sigma^2(x, y)}. \quad (12)$$

Equation (12) can be generalized to express the stairs tone strength $K_S$ as Equation (13), below:

$$K_S = \frac{k_\nabla \cdot \nabla^2}{k_\sigma \cdot \sigma^2} = k \cdot \frac{\nabla^2}{\sigma^2}. \quad (13)$$

As another example, the $\epsilon$ value adjusting unit 135 can calculate the stairs tone strength $K_S$ from the discrepancy using a difference between the square of the gradient $\nabla$ and the variance $\sigma^2$. In this case, letting the coordinates of a pixel of interest be (x, y), the stairs tone strength $K_S(x, y)$ for the pixel of interest can be calculated from the gradient $\nabla(x, y)$ and the variance $\sigma^2(x, y)$ of the pixel of interest as expressed by Equation (14), below:

$$K_S(x,y) = k_\sigma \cdot \sigma^2(x,y) \ldots k_\nabla \cdot \nabla^2(x,y). \quad (14)$$

Equation (14) can be generalized to express the stairs tone strength $K_S$ as Equation (15), below:

$$K_S = k_\sigma \cdot \sigma^2 - k_\nabla \cdot \nabla^2. \quad (15)$$

Figure 9:
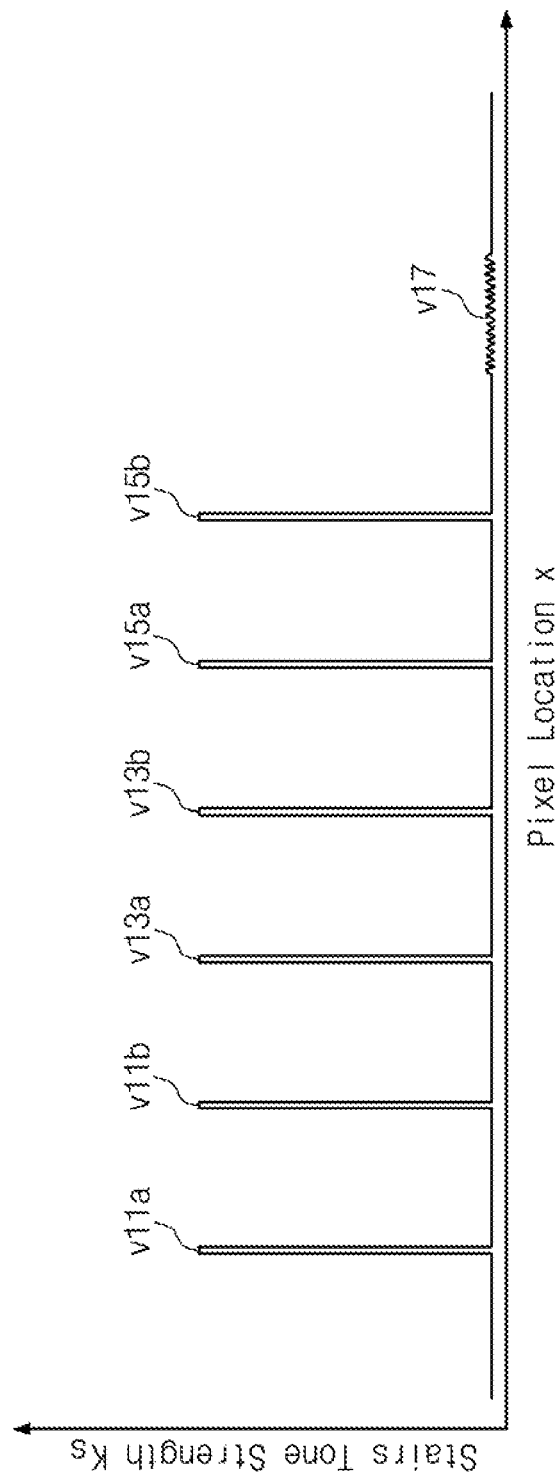
FIG. 9 is a graph that illustrates an example of a change in a stairs tone strength for each pixel of an input image calculated on the basis of the input illustrated in FIG. 5.

As described above, the $\epsilon$ value adjusting unit 135 calculates the stairs tone strength $K_S$ based on the discrepancy between the gradient $\nabla$ and the standard deviation $\sigma$ (or the variance $\sigma^2$). For example, FIG. 9 illustrates a change in the stairs tone strength $K_S$ for each pixel of the input image II illustrated in FIG. 5. i.e., calculated on the basis of the gradient $\nabla$ for each pixel illustrated in FIG. 6 and the standard deviation $\sigma$ for each pixel illustrated in FIG. 8. That is, the horizontal axis of the graph of FIG. 9 corresponds to the horizontal axes of the graphs of FIGS. 5, 6 and 8 and indicates a pixel location in the input image with respect to the x direction. Furthermore, the vertical axis of the graph of FIG. 9 indicates the stairs tone strength $K_S$ calculated for each pixel.

As shown in FIG. 9, stairs tone edges v11a, v11b, v13a, v13b, v15a, and v15b differ from pattern zone edge v17 with respect to the stairs tone strength $K_S$.

As a specific example, when the stairs tone strength $K_S$ is calculated, an operator length n for calculating the gradient $\nabla$ is initialized to the same value as an operator length m for calculating the variance $\sigma^2$. In this case, regarding a stairs tone edge, even if the compensation coefficients $k_\nabla$ and $k_\sigma$ are set to be 1, there is little difference between the absolute value of the gradient $\nabla$ and the standard deviation $\sigma$, and the stairs tone strength $K_S$ is approximately 1. On the other hand, regarding a pattern tone edge, the absolute value of the gradient $\nabla$ is less than the standard deviation $\sigma$, and the stairs tone strength $K_S$ has a lesser value than that for a stairs tone edge.

On the basis of such characteristics, the $\epsilon$ value adjusting unit 135 calculates, for each pixel of interest of an input image, an edge strength $K_G$ for a pattern tone edge by multiplying the absolute value of the gradient $\nabla$ of the pixel of interest by the stairs tone strength $K_S$ calculated for the pixel of interest. That is, letting the coordinates of a pixel of interest be (x, y), the edge strength $K_G(x, y)$ of the pixel of interest is calculated from the gradient $\nabla(x, y)$ and the stairs tone strength $K_S$ of the pixel of interest as expressed by Equation (16) below:

$$K_G(x,y) = |\nabla(x,y)| \cdot K_S. \quad (16)$$

The operator length n for calculating the gradient $\nabla$ and the operator length m for calculating the variance $\sigma^2$ may be set such that n≤m.

As another example, the $\epsilon$ value adjusting unit 135 can calculate, for each pixel of interest of an input image, the edge strength $K_G$ by multiplying a gradient $\nabla^2$ of the pixel by the stairs tone strength $K_S$ as expressed by Equation (17) below:

$$K_G(x,y) = \nabla^2(x,y) \cdot K_S. \quad (17)$$

Figure 10:
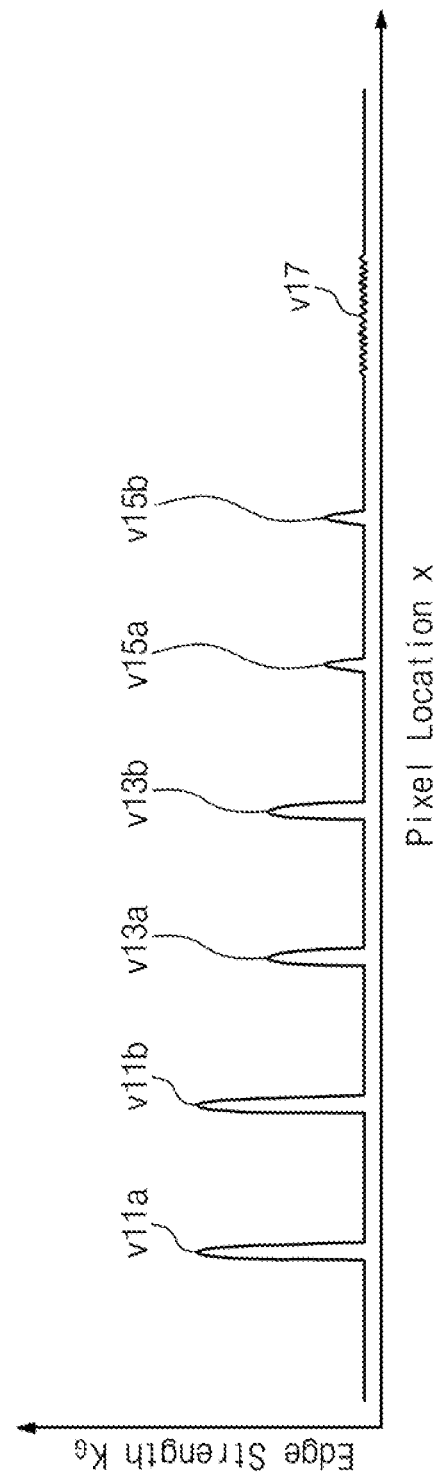
FIG. 10 is a graph that illustrates an example of a change in an edge strength for each pixel of an input image calculated on the basis of the input illustrated in FIG. 5.

As described above, the $\epsilon$ value adjusting unit 135 calculates, for each pixel of interest of an input image, the edge strength $K_G$ from the gradient $\nabla$ of the pixel of interest and the stairs tone strength $K_S$ of the pixel of interest. For example, FIG. 10 illustrates a change in the edge strength $K_G$ for each pixel of the input image II illustrated in FIG. 5, i.e., calculated from the gradient $\nabla$ for each pixel illustrated in FIG. 6 and the stairs tone strength $K_S$ for each pixel illustrated in FIG. 9. That is, the horizontal axis of the graph of FIG. 10 corresponds to the horizontal axes of the graphs of FIGS. 5, 6 and 9 and indicates a pixel location in the input image with respect to the x direction. Furthermore, the vertical axis of the graph of FIG. 10 indicates the edge strength $K_G$ calculated for each pixel.

As shown in FIG. 10, since the edge strength $K_G$ is calculated from the stairs tone strength $K_S$ and the gradient $\nabla$ for each pixel of interest, a pattern tone edge v17 is suppressed, and stairs pattern edges v11a, v11b, v13a, v13b, v15a, and v15b can be extracted using the edge strength $K_G$. That is, the $\epsilon$ value adjusting unit 135 adjusts the $\epsilon$ value on the basis of the edge strength K calculated as described above performs edge strength-$\epsilon$ value conversion, so that, between a stairs tone edge and a pattern tone edge, the stairs tone edge is maintained.

Figure 11:
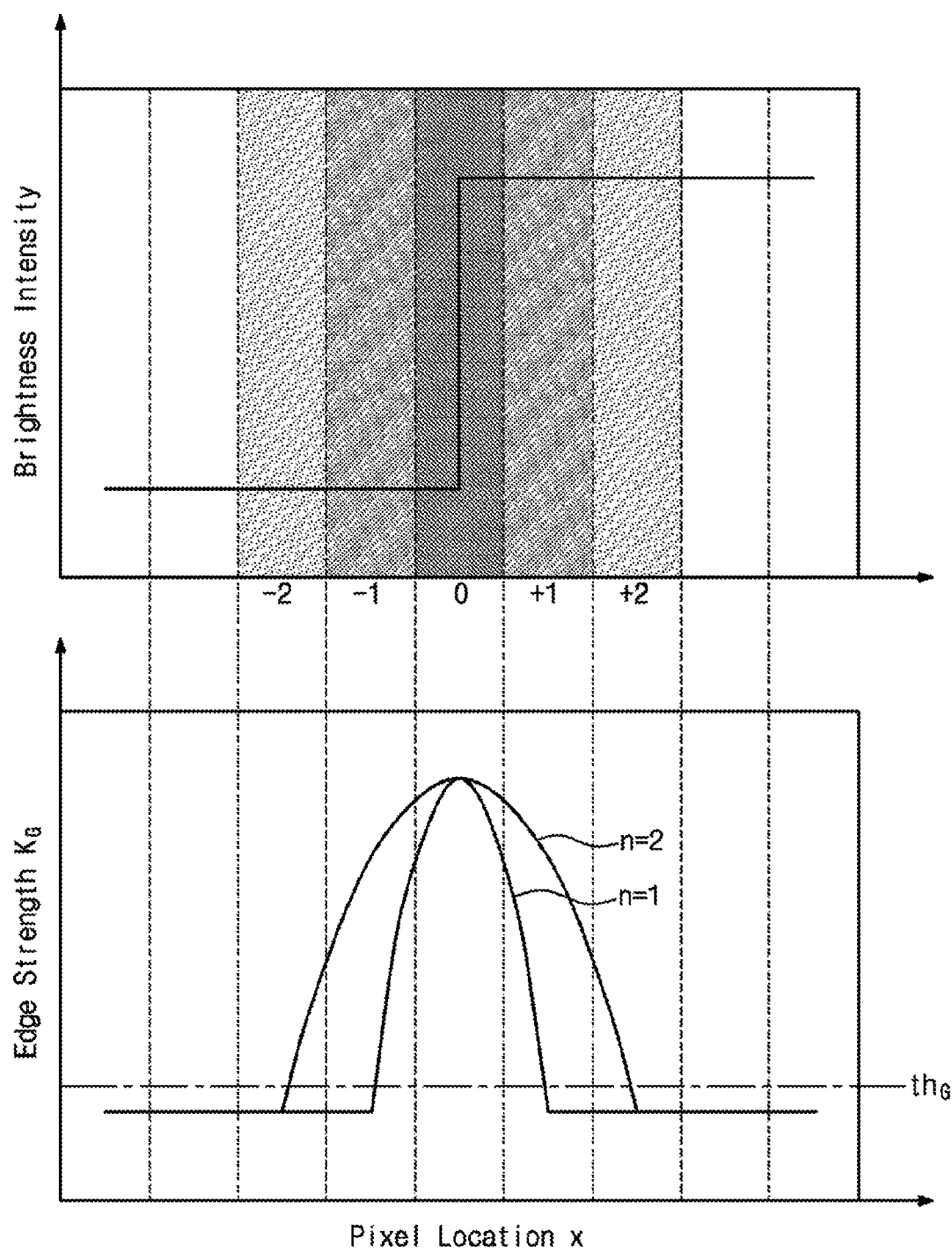
FIG. 11 illustrates a process of adjusting an ϵ value by an ϵ value adjusting unit according to an embodiment.

The adjustment of the $\epsilon$ value performed by the $\epsilon$ value adjusting unit 135 based on the edge strength $K_G$ will be described in detail with reference to FIG. 11. FIG. 11 illustrates a process of adjusting the $\epsilon$ value by the $\epsilon$ value adjusting unit 135 according to a present embodiment.

The upper graph of FIG. 11 illustrates a change in brightness strength for each pixel of an input image. The lower graph of FIG. 11 illustrates a change in the edge strength $K_G$ for each pixel of interest of the input image. The horizontal axes of each of the upper and lower graphs of FIG. 11 indicate a pixel location in the input image with respect to the x direction. Furthermore, the vertical axis of the upper graph of FIG. 11 indicates a brightness intensity, and the vertical axis of the lower graph of FIG. 11 indicates the edge strength $K_G$.

In FIG. 11, n represents an operator length, and it is assumed that the operator length n for calculating the gradient $\nabla$ and the operator length m for calculating the variance $\sigma^2$ satisfy the relation of m=n. Furthermore, in FIG. 11, pixel location (x)=0 corresponds to a stairs tone edge, and the locations of x=±1, ±2 correspond to adjacent pixels along the x direction, assuming that a pixel at location (x)=0 is a pixel of interest.

In the example illustrated in FIG. 11, a halo phenomenon may occur where the pixel location (x) ranges from −2 to +2, assuming that the operator length n of an $\epsilon$ filter is 2. Therefore, in the example illustrated in FIG. 11, the $\epsilon$ value of the $\epsilon$ filter can decreased. i.e., minimized, where the pixel location (x) ranges from −2 to +2.

Therefore, as illustrated in the lower graph of FIG. 11, the $\epsilon$ value adjusting unit 135 sets a threshold value $th_G$ of the edge strength $K_G$ and compares the edge strength $K_G$ calculated for each pixel of interest with the threshold value $th_G$. For example, the $\epsilon$ value adjusting unit 135 can set the $\epsilon$ value to a minimum value $\epsilon_{MIN}$ for a pixel whose edge strength $K_G$ exceeds the threshold value $th_G$, and sets the $\epsilon$ value to a maximum value $\epsilon_{MAX}$ for a pixel whose edge strength $K_G$ is less than or equal to the threshold value $th_G$.

Figure 12:
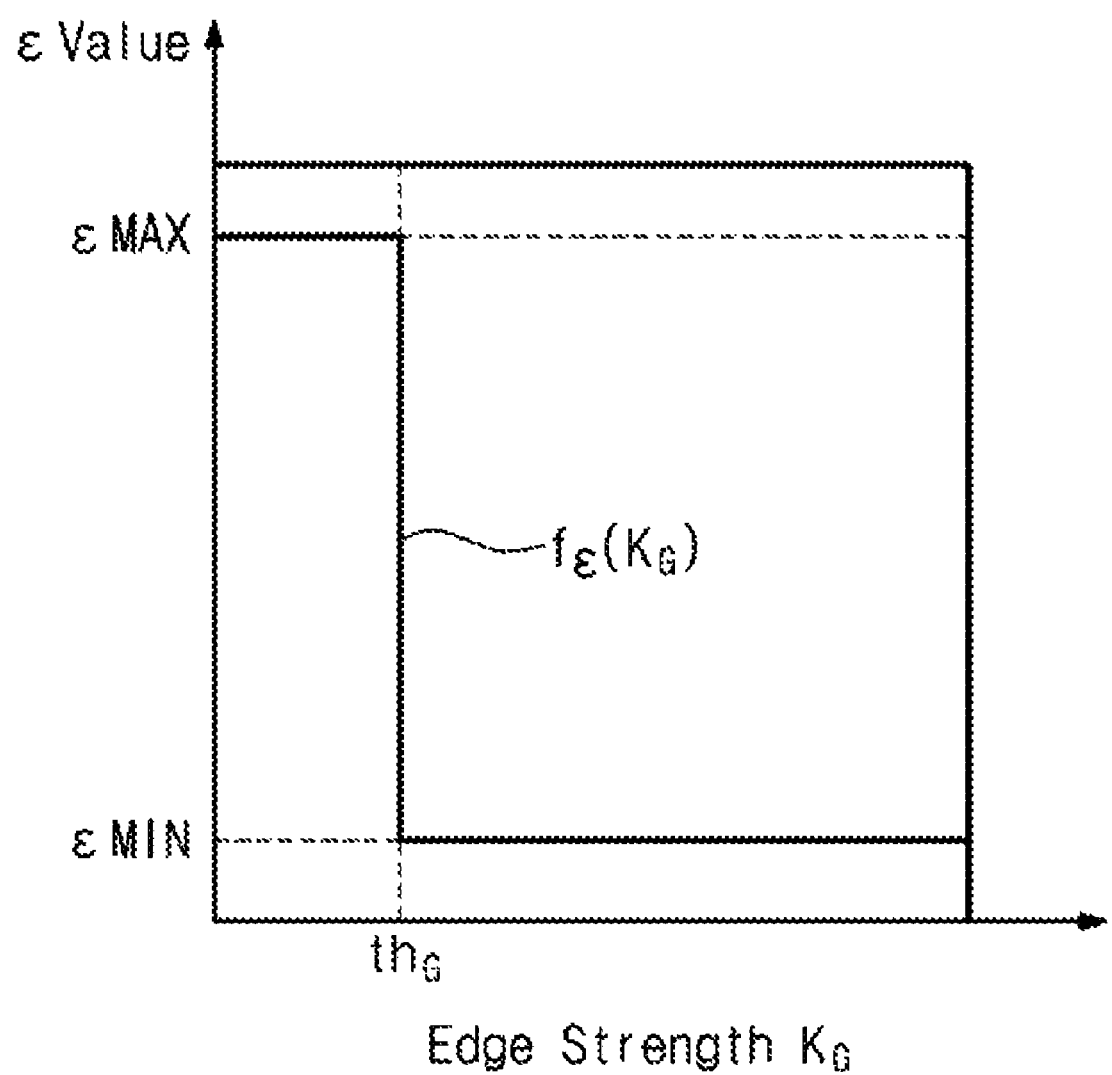
FIG. 12 illustrates an exemplary function for setting the ϵ value by the ϵ value adjusting unit according to the edge strength.

For example, FIG. 12 illustrates an exemplary function $f_\epsilon(K_G)$ for performing edge strength-$\epsilon$ value conversion by setting, by the $\epsilon$ value adjusting unit 135, the $\epsilon$ value based on the edge strength $K_G$.

Figure 13:
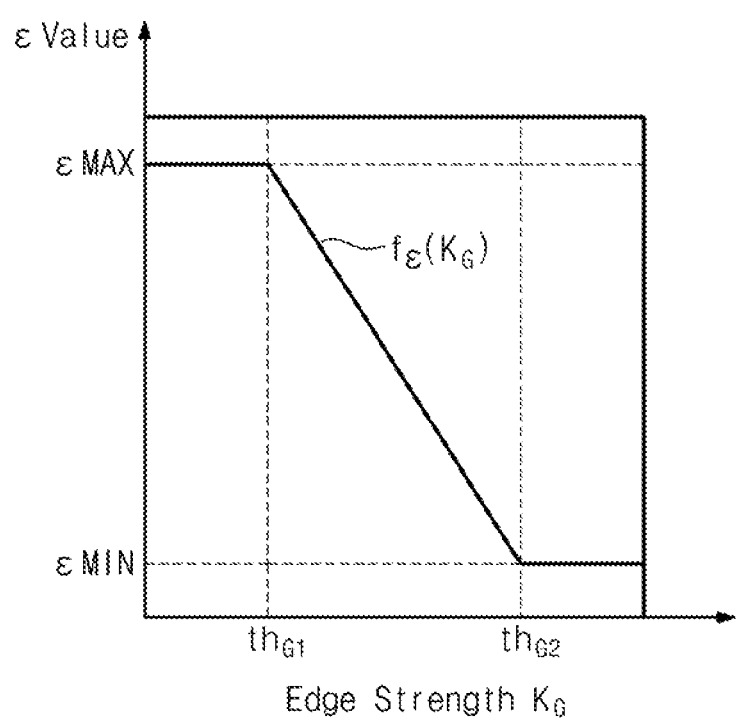
FIG. 13 illustrates another exemplary function for setting the ϵ value by the ϵ value adjusting unit according to the edge strength.

For comparison, FIG. 13 illustrates another exemplary function $f_\epsilon(K_G)$ for performing the edge strength-$\epsilon$ value conversion by the $\epsilon$ value adjusting unit 135. A comparative example of FIG. 13 illustrates a function $f_\epsilon(K_G)$ that performs edge strength-$\epsilon$ value conversion using the same method as the $\epsilon$ value adjusting unit 193 of the illumination light generation unit 10' of FIG. 2.

As illustrated in FIG. 13, the $\epsilon$ value adjusting unit 193 according to a comparative example performs linear modulation in a portion between the maximum and minimum values $\epsilon_{MAX}$ and $M_{MIN}$ of the $\epsilon$ value that are functions of the threshold values $th_{G1}$ and $th_{G2}$. This is because the $\epsilon$ value should be uniformly controlled by the edge strength $K_G$ without differentiating a stairs tone edge from a pattern tone edge, since it is challenging for the $\epsilon$ value adjusting unit 193 to differentiate a stairs tone edge from a pattern tone edge.

Due to such characteristics, according to the $\epsilon$ value adjusting unit 193 according to a comparative example, a high edge strength pattern tone edge may be maintained without being smoothed, and a low edge strength stairs tone edge may be smoothed and not maintained. Furthermore, according to the $\epsilon$ value adjusting unit 193 according to a comparative example, for example, a smoothing operation is performed on a pixel with a relatively low edge strength than an intermediate edge strength, as indicated at positions x=±1, ±2 in FIG. 11. Therefore, a pixel's edge maintenance is decreased, and a weak halo phenomenon may occur in the vicinity of the pixel due to the smoothing operation.

Regarding this issue, the $\epsilon$ value adjusting unit 135 according to an embodiment adjusts the $\epsilon$ value based on the edge strength $K_G$ calculated on the basis of the stairs tone strength $K_S$ and the gradient $\nabla$ for each pixel of interest. As described above, the edge strength $K_G$ has a high value for a stairs tone edge and a low value for a pattern tone edge. Therefore, the $\epsilon$ value adjusting unit 135 can perform edge strength-$\epsilon$ value conversion by threshold processing based on the threshold value $th_G$ as illustrated in FIG. 12.

Furthermore, due to the above-mentioned characteristics of the edge strength $K_G$, the $\epsilon$ value adjusting unit 135 according to a present embodiment may set the threshold value $th_{G1}$ to a relatively low value, lower than at least the threshold value $th_{G2}$ shown in FIG. 13. Therefore, according to the $\epsilon$ value adjusting unit 135 according to a present embodiment, an edge can be maintained even for a pixel with a relatively low edge strength indicated at positions x=±1, ±2 in FIG. 11.

Figure 14:
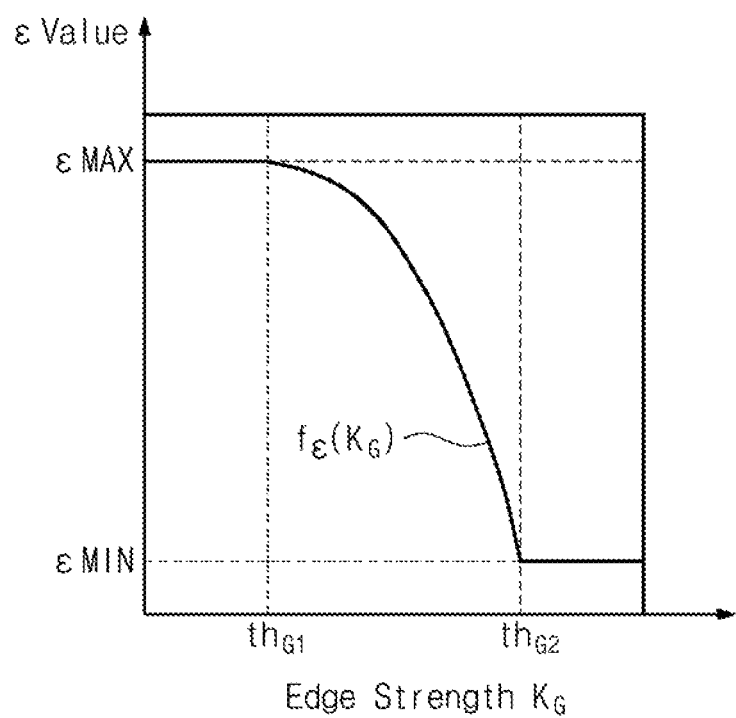
FIG. 14 illustrates another exemplary function for setting the ϵ value by the ϵ value adjusting unit according to the edge strength.

Furthermore, the function $f_\epsilon(K_G)$ of FIG. 12 is merely an example, and the $\epsilon$ value adjusting unit 135 according to a present embodiment may apply the function $f_\epsilon(K_G)$ of FIG. 13 to the edge strength $K_G$ calculated from the stairs tone strength $K_S$ and the gradient $\nabla$ for each pixel of interest. For another example, the $\epsilon$ value adjusting unit 135 may apply the function $f_\epsilon(K_G)$ of FIG. 14 to the edge strength $K_G$ calculated from the stairs tone strength $K_S$ and the gradient $\nabla$ for each pixel of interest, to perform edge strength-$\epsilon$ value conversion. FIG. 14 illustrates another example of the function $f_\epsilon(K_G)$ for performing edge strength-$\epsilon$ value conversion by setting, by the $\epsilon$ value adjusting unit 135, the $\epsilon$ value based on the edge strength $K_G$.

As described above, the $\epsilon$ value adjusting unit 135 sets the $\epsilon$ value for each pixel of interest based on the edge strength $K_G$ calculated for each pixel of interest of an input image, and outputs the $\epsilon$ value to the smoothing processing unit 11.

The following process is the same as that described above with respect to the illumination light generation unit 10' according to a comparative example. That is, the smoothing processing unit 11 receives, from the $\epsilon$ value adjusting unit 135, the c value calculated for each pixel of interest of an input image, and applies an $\epsilon$ filter to the pixel of interest and pixels adjacent thereto based on the acquired $\epsilon$ value. As described above, the smoothing processing unit 11 performs a smoothing operation by applying the $\epsilon$ filter to the input II, and outputs a brightness component obtained after performing the smoothing operation as the illumination light component LL.

2.3. Processing

Figure 15:
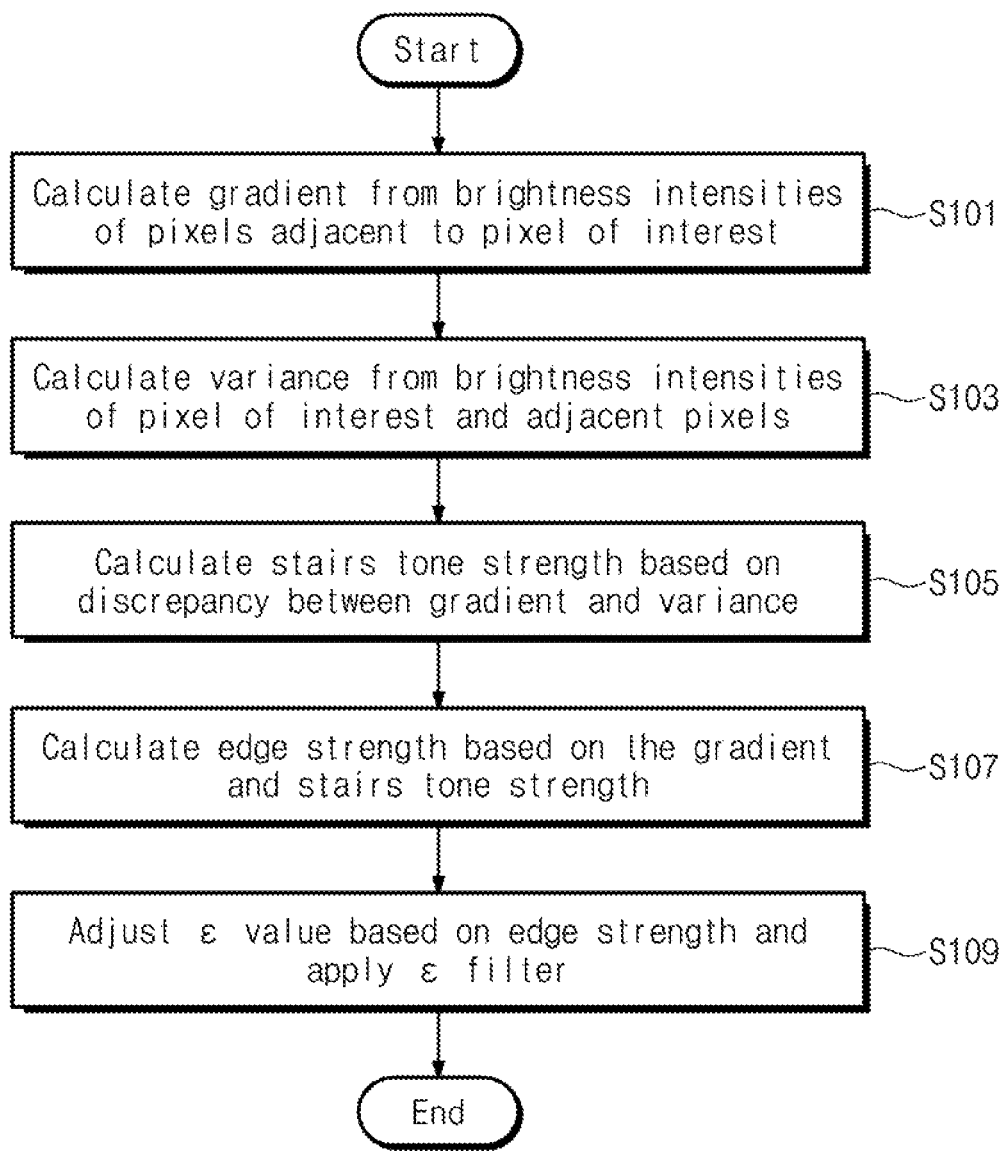
FIG. 15 is a flowchart of an operation method of an illumination light generation unit according to an embodiment.

An operation method of the illumination light generation unit 10 according to a present embodiment will be described with reference to FIG. 15. FIG. 15 is a flowchart of an operation method of the illumination light generation unit 10 according to an embodiment.

Operation S101

The gradient calculation unit 131 calculates the gradient $\nabla$ for each pixel of interest from a brightness intensity of pixels adjacent to the pixel of interest, where each pixel of the input image 11 is sequentially processed as the pixel of interest. Furthermore, the gradient calculation unit 131 may calculate the gradient $\nabla$ for each pixel of interest by calculating a convolution integral using a filter operator. The gradient $\nabla$ may be calculated on the basis of any one of Equations (2) and (3). Furthermore, the gradient calculation unit 131 outputs, to the $\epsilon$ value adjusting unit 135, the gradient $\nabla$ for each pixel of interest.

Operation S103

The variance calculation unit 133 calculates a variance $\sigma^2$ for each pixel of interest from the brightness intensities of the pixel of interest and of pixels adjacent to the pixel of interest, where each pixel of the input image II is sequentially processed as the pixel of interest. The variance $\sigma^2$ may be calculated from Equation (8). Furthermore, the variance calculation unit 133 outputs, to the $\epsilon$ value adjusting unit 135, the variance $\sigma^2$ for each pixel of interest.

Operation S105

The $\epsilon$ value adjusting unit 135 receives, from the gradient calculation unit 131, the gradient $\nabla$ for each pixel of interest, and, from the variance calculation unit 133, the variance $\sigma^2$ for each pixel of interest. The $\epsilon$ value adjusting unit 135 calculates the stairs tone strength $K_S$ based on the discrepancy between the gradient $\nabla$ and the standard deviation $\sigma$ for each pixel of interest. The stairs tone strength $K_S$ may be calculated using any one of Equations (10), (12) and (14).

Operation S107

Thereafter, the $\epsilon$ value adjusting unit 135 calculates, for each pixel of interest, the edge strength $K_G$ from the gradient $\nabla$ for the pixel of interest and the stairs tone strength $K_S$ for the pixel of interest. The edge strength $K_G$ may be calculated on the basis of any one of Equations (16) and (17).

Operation S109

Once the edge strength $K_G$ is calculated for each pixel of interest, the $\epsilon$ value adjusting unit 135 compares the edge strength $K_G$ with the predetermined threshold value $th_G$ for each pixel of interest, and sets the $\epsilon$ value for the pixel of interest according to the comparison result. As a specific example, based on the function $f_\epsilon(K_G)$ of FIG. 12, the $\epsilon$ value adjusting unit 135 sets the $\epsilon$ value to the minimum value $\epsilon_{MIN}$ for a pixel for which the edge strength $K_G$ exceeds the threshold value $th_G$, and sets the $\epsilon$ value to the maximum value $E_{MAX}$ for a pixel for which the edge strength $K_G$ is less than or equal to the threshold value $th_G th_G$.

As described above, the $\epsilon$ value adjusting unit 135 sets the $\epsilon$ value for each pixel of interest abased on the edge strength $K_G$ calculated for each pixel of interest of an input image, and outputs the set $\epsilon$ value to the smoothing processing unit 11.

The smoothing processing unit 11 receives, from the $\epsilon$ value adjusting unit 135, the $\epsilon$ value for each pixel of interest of an input image, and applies an $\epsilon$ filter to the pixel of interest and pixels adjacent thereto on the basis of the acquired $\epsilon$ value. As described above, the smoothing processing unit 11 performs a smoothing operation by applying the $\epsilon$ filter to the input 11, and outputs a brightness component that results from the smoothing operation as the illumination light component LL.

An example of an "image processing method" corresponds to the above-described series of operations in which the edge strength $K_G$ is calculated from the stairs tone strength KS, which measures the discrepancy between the gradient $\nabla$ and the variance $\sigma^a$, and a smoothing operation is performed on the input image based on an $\epsilon$ value set based on the edge strength $K_G$.

The above-mentioned series of operations can be performed by a program that processes each element of the display device 10 and executes on a central processing unit (CPU). This program may be configured to be executed by an operating system (OS) installed in the device. A storage location of the program is not limited as long as it is readable by a device that includes a CPU for performing the above-described processing. For example, the program may be stored in an external recording medium accessible from the device. In this case, the recording medium in which the program is stored may be accessed by the device so that the CPU of the device can execute the program.

2.4. Summary

As described above, the illumination light generation unit 10 according to an embodiment of the inventive concept calculates the gradient $\nabla$ and the variance $\sigma^2$ (or the standard deviation $\sigma$) for each pixel of interest, and calculates the stairs tone strength $K_S$ based on the discrepancy between the gradient $\nabla$ and the variance $\sigma^2$. Furthermore, the illumination light generation unit 10 calculates the edge strength $K_G$ based on the stairs tone strength $K_S$ and the gradient $\nabla$, and adjusts the $\epsilon$ value based on the edge strength $K_G$. As described above, the edge strength $K_G$ has a high value for a stairs tone edge and has a low value for a pattern tone edge. Therefore, the illumination light generation unit 10 can differentiate a stairs tone edge from a pattern tone edge in an input image, and can perform a nonlinear smoothing that reduces smoothing for a stairs tone edge and increases smoothing for other portions, including a pattern tone edge.

3. Another Embodiment

3.1. Overview

An illumination light generation unit according to an embodiment of the inventive concept will be described. In the illumination light generation unit 10 according to an embodiment of FIG. 7, an output value of an $\epsilon$ filter is used as an illumination light component.

When a reference pixel range of the $\epsilon$ filter is relatively wide, a weighted average coefficient based on a Gaussian distribution may be used as a smoothing coefficient. As the reference pixel range of the $\epsilon$ filter increases, the processing cost increases, which can increase a circuit size.

Here, to assist in understanding an illumination light generation unit according to a present embodiment, a process performed by the $\epsilon$ filter to calculate an illumination light component LL(x, y) on the basis of a pixel value $I_{x,y}$ of a pixel of interest (x, y) is expressed as Equation (18) below:

$$L(x, y) = I_{x,y} + \sum_{i=-n}^{n} \sum_{j=-n}^{n} W_{i,j} F(I_{x-i,y-j} - I_{x,y}) \quad (18)$$

$$\sum_{i=-n}^{n} \sum_{j=-n}^{n} W_{i,j} = 1$$

$$F(\pm z) = \begin{cases} \pm z & \dots \|z\| \le \varepsilon \\ 0 & \dots \text{otherwise} \end{cases}.$$

In Equation (18), the coefficient W is a weighted average filter coefficient that applies a weight so that the sum total of coefficients is 1. The function F(z) is a smoothing filter so that a difference between values of a pixel of interest and a reference pixel is added to the pixel of interest. According to Equation (18), if a difference value is larger than the $\varepsilon$ value, reference pixel information is not output as a result, so that an edge is maintained.

As described above, since the $\varepsilon$ filter requires the calculation of the difference value between a pixel of interest and each reference pixel and a comparison of the difference value with the $\varepsilon$ value, a relatively large cost is incurred, and a circuit size may be increased.

Portable terminals such as smartphones are currently widely used, and such terminals are limited in terms of a size of a circuit included therein.

Described below is an illumination light generation unit according to another embodiment of the inventive concept which can differentiate a stairs tone edge from a pattern zone edge to perform nonlinear processing and further enables a reduction in circuit size. Hereinafter, an illumination light generation unit according to a present embodiment may be referred to by reference number 20 to be differentiated from the illumination light generation unit 10 according to an embodiment of FIG. 7.

3.2. Function Configuration

Figure 16:
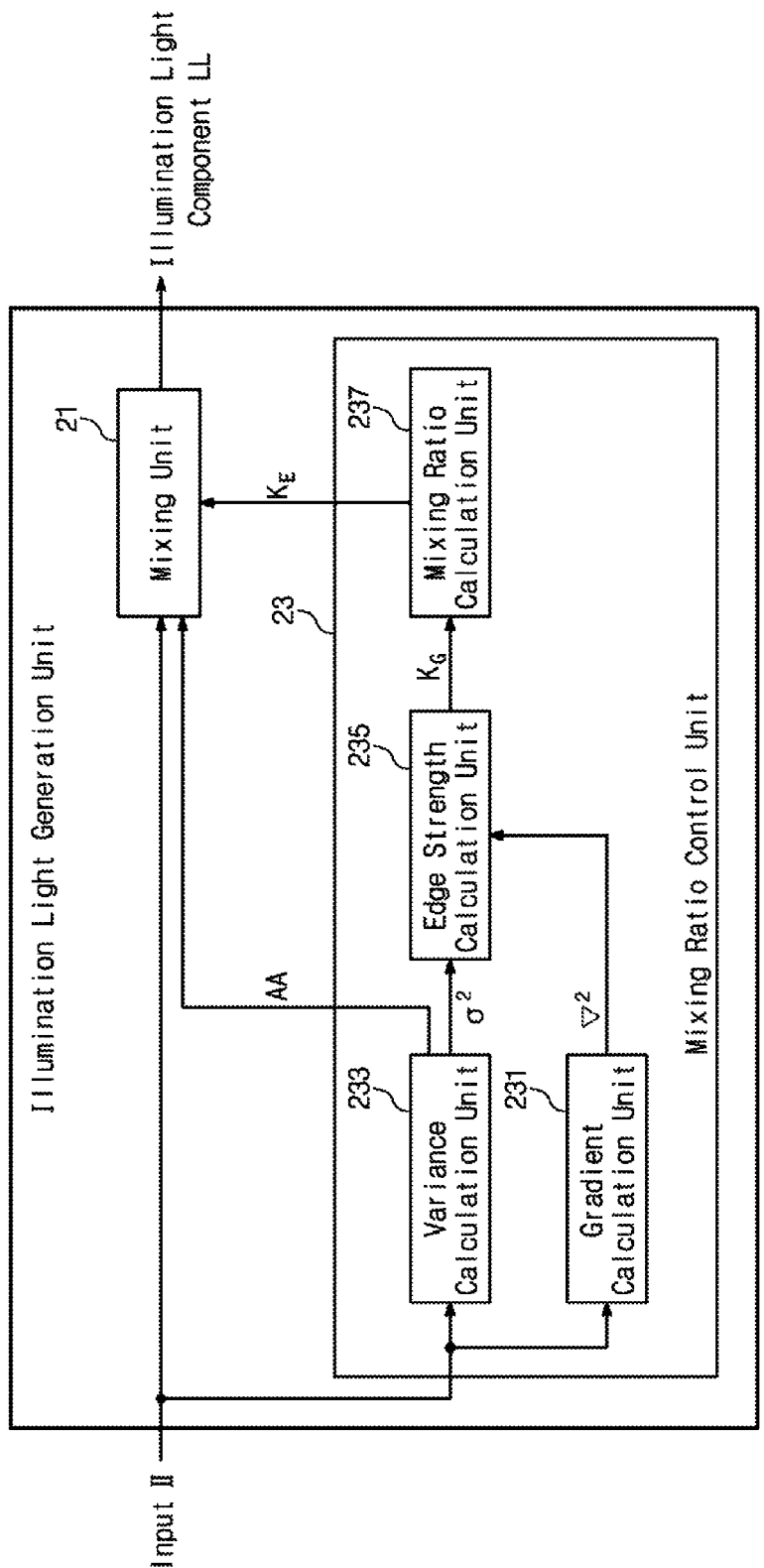
FIG. 16 is a block diagram of an exemplary configuration of an illumination light generation unit according to an embodiment of the inventive concept.

An exemplary configuration of the illumination light generation unit 20 according to a present embodiment will be described with reference to FIG. 16. FIG. 16 is a block diagram of an exemplary configuration of the illumination light generation unit 20 according to a present embodiment.

As illustrated in FIG. 16, the illumination light generation unit 20 according to a present embodiment includes a mixing unit 21 and a mixing ratio control unit 23. The mixing ratio control unit 23 includes a gradient calculation unit 231, a variance calculation unit 233, an edge strength calculation unit 235, and a mixing ratio calculation unit 237.

The gradient calculation unit 231 calculates the square of a gradient $\nabla$ for each pixel of interest from brightness intensities of pixels adjacent to the pixel of interest using a gradient operator W, where each pixel of the input image II is sequentially processed as the pixel of interest. The gradient calculation unit 231 calculates the gradient $\nabla$ in the same manner as the gradient calculation unit 131 according to an embodiment of FIG. 7. Equation (19) shown below is an example of a gradient operator W when the operator length n=2:

$$W = [-1 \quad -1 \quad 0 \quad 1 \quad 1] \cdot \frac{1}{4}. \quad (19)$$

Equation (20) shown below is another example of the gradient operator W when the operator length n=2:

$$W = \begin{bmatrix} -1 & -1 & 0 & 1 & 1 \\ -1 & -1 & 0 & 1 & 1 \\ -1 & -1 & 0 & 1 & 1 \\ -1 & -1 & 0 & 1 & 1 \\ -1 & -1 & 0 & 1 & 1 \end{bmatrix} \cdot \frac{1}{20}. \quad (20)$$

The gradient operators W in Equations (19) and (20) are merely examples, and embodiments are not limited thereto. That is, as a pass band is adjusted, coefficients other than those of Equation (19) or (20) may be used for the gradient operator W.

Furthermore, the gradient calculation unit 231 can calculate $\nabla^2$, the square of the gradient $\nabla$, for each pixel of interest by calculating a convolution integral using the gradient operator W. Hereinafter, the square $\nabla^2$ of the gradient $\nabla$ will be referred to as a "gradient $\nabla^2$". Equation (21), below, is an example of a formula for calculating the gradient $\nabla^2$ by calculating a convolution integral using the gradient operator W. In Equation (21), W' denotes a coefficient obtained by rotating the gradient operator W by 90 degrees.

$$\nabla^2(x,y) = \{(W \otimes I)^2 (W' \otimes I)^2\}/2 \quad (21)$$

As described above, for each pixel of interest, the gradient calculation unit 231 calculates the gradient $\nabla^2$ from the brightness intensities of pixels adjacent to the pixel of interest. Furthermore, the gradient calculation unit 231 outputs, to the edge strength calculation unit 235, the gradient $\nabla^2$ for each pixel of interest.

The variance calculation unit 233 calculates, for each pixel of interest, an average value AA of the brightness intensities of the pixel of interest and of pixels adjacent to the pixel of interest, i.e., calculates a moving average, and calculates the variance $\sigma^2$ for each pixel from the average value AA, where each pixel of the input image II is sequentially processes as the pixel of interest.

Here, letting the coordinates of the pixel of interest be (x, y), the operator length be n, and the brightness intensity of a pixel positioned at the coordinates (x, y) be $I_{x,y}$, the average value A(x, y) is expressed by convolution integral shown in Equation (22) below:

$$A(x, y) = \frac{1}{(2n+1)^2} \sum_{i=-n}^{n} \sum_{j=-n}^{n} I_{x-i, y-j} \quad (22)$$

$$= \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \cdot \frac{1}{25} \otimes I.$$

The operator length n, i.e., the reference pixel range, for calculating the average value AA may be set based on a circuit size of a device in which the illumination light generation unit 20 is disposed.

The variance $\sigma^2$ for the pixel of interest (x, y) is calculated using Equation (23) below, where the coordinates of the pixel of interest are (x, y) and the brightness intensity of a pixel located at the coordinates (x-i, y-j) is $I_{x-j,y-j}$:

$$\sigma^2(x, y) = \frac{1}{(2n+1)^2} \sum_{i=-n}^{n} \sum_{j=-n}^{n} I_{x-i, y-j}^2 - A^2(x, y). \quad (23)$$

As described above, for each pixel of interest, the variance calculation unit 233 calculates the average value AA from the brightness intensities of the pixel of interest and of pixels adjacent to the pixel of interest, and calculates the variance $\sigma^2$ from the average value AA for each pixel of interest. Furthermore, the variance calculation unit 233 outputs, to the edge strength calculation unit 235, the variance $\sigma^2$ for each pixel of interest. Furthermore, while calculating the variance $\sigma^2$, the variance calculation unit 233 outputs, to the mixing unit 21, the average value AA, i.e., a moving average, calculated for each pixel of interest.

The edge strength calculation unit 235 receives, from the gradient calculation unit 231, the gradient $\nabla^2$ for each pixel of interest, and, from the variance calculation unit 233, the variance $\sigma^2$ for each pixel of interest. The edge strength calculation unit 235 calculates the discrepancy between the gradient $\nabla^2$ and the variance $\sigma^2$ as the stairs tone strength $K_S$.

For example, letting the coordinates of a pixel of interest be (x, y), the stairs tone strength $K_S(x, y)$ of the pixel of interest is calculated from the gradient $\nabla^2(x, y)$ and the variance $\sigma^2(x, y)$ of the pixel of interest using Equation (24), below:

$$K_S(x, y) = \begin{cases} \nabla^2(x, y)/\sigma^2(x, y) & \ldots \nabla^2(x, y)/\sigma^2(x, y) \leq 1 \\ 1 & \ldots \text{otherwise} \end{cases} \quad (24)$$

According to Equation (24), the edge strength calculation unit 235 clips a value of $\nabla^2(x, y)/\sigma^2(x, y)$ so that $\nabla^2(x, y)/\sigma^2(x, y)$ does not exceed 1. As another example, the edge strength calculation unit 235 may normalize the calculated value of $\nabla^2(x, y)/\sigma^2(x, y)$ so that $\nabla^2(x, y)/\sigma^2(x, y)$ does not exceed 1.

Thereafter, the edge strength unit 235 calculates, for each pixel of interest of an input image, the edge strength $K_G$, for a pattern tone edge by multiplying the gradient $\nabla^2$ of the pixel of interest by the stairs tone strength $K_S$ of the pixel of interest. Here, letting the coordinates of a pixel of interest be (x, y), the edge strength $K_G$ (x, y) of the pixel of interest is calculated from the gradient $\nabla^2(x, y)$ and the stairs tone strength $K_S$ of the pixel of interest using Equation (25), below:

$$K_G(x,y) = \alpha \cdot \nabla^2(x,y) \cdot K_S \quad (25)$$

Here, $\alpha$ is a constant for enhancing the edge strength $K_G$. Since the edge strength $K_G$ is calculated from the square of the gradient $\nabla$, i.e., the gradient $\nabla^2$, the calculated value of the edge strength $K_G$ may be relatively small. Thus, the strength is enhanced by multiplying the gradient by $\alpha$ in Equation (25). As another example, as described above with respect to Equation (16), the edge strength calculation unit 235 may calculate the edge strength $K_G$ from the absolute value of the gradient $\nabla$ and the stairs tone strength $K_S$.

Therefore, the edge strength calculation unit 235 calculates, for each pixel of interest of an input image, the edge strength $K_G$ from the gradient $\nabla^2$ of the pixel of interest and the stairs tone strength $K_S$ of the pixel of interest. The edge strength calculation unit 235 outputs, to the mixing ratio calculation unit 237, the edge strength $K_G$ for each pixel of interest of an input image.

Figure 17:
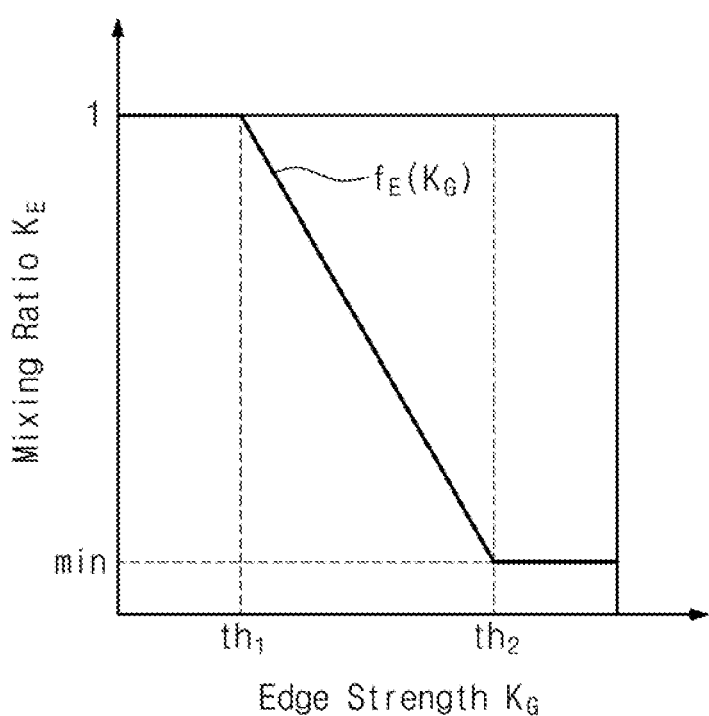
FIG. 17 illustrates an example of a conversion function that performs edge strength-mixing ratio conversion.

The mixing ratio calculation unit 237 receives, from the edge strength calculation unit 235, the edge strength $K_G$ for each pixel of interest of an input image. The mixing ratio calculation unit 237 converts the edge strength $K_G$ for each pixel of interest into a mixing ratio $K_E$ on the basis of a preset conversion function $f_E(K_G)$, i.e. $K_E = f_E(K)$. For example, FIG. 17 illustrates an example of a conversion function $f_E(K_G)$ for performing edge strength $K_G$— mixing ratio $K_E$ conversion by the mixing ratio calculation unit 237. The conversion function $f_E(K_G)$ of FIG. 17 is expressed by Equation (26) below, where min is shown in FIG. 17:

$$f_E(K_G) = \begin{cases} 1 & \ldots K_G < th_1 \\ \min & \ldots K_G \geq th_2 \\ \frac{(1-\min)(th_2 - K_G)}{th_2 - th_1} + \min & \ldots \text{otherwise} \end{cases} \quad (26)$$

According to Equation (26), the mixing ratio calculation unit 237 linearly modulates in an area between a maximum value of 1 and a minimum value min of the mixing ratio $K_E$ that are functions of threshold values $th_1$ and $th_2$. If $\alpha=8$ for Equation (25), good illumination light extraction may be achieved by adjusting the minimum value min and the threshold values $th_1$ and $th_2$ such that min=0.0-0.2 and $th_1$, $th_2$=0.02-0.8 ($th_1 \leq th_2$).

Figure 18:
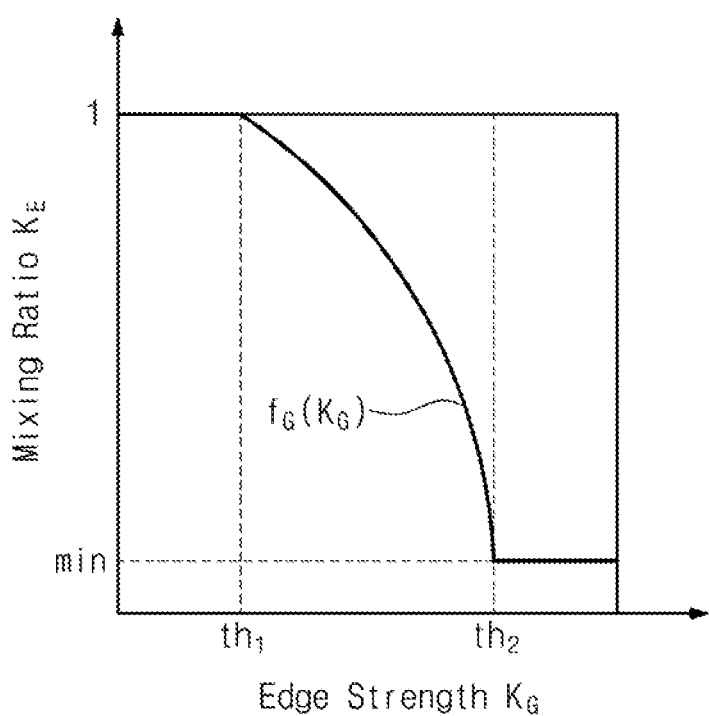
FIG. 18 illustrates another example of a conversion function that performs edge strength-mixing ratio conversion.

The conversion function $f_E(K_G)$ of FIG. 17 is merely an example, and embodiments are not limited thereto. For example, FIG. 18 illustrates another example of a conversion function $f_E(K_G)$ for performing edge strength $K_G$- mixing ratio $K_E$ conversion by the mixing ratio calculation unit 237. As illustrated in FIG. 18, the mixing ratio calculation unit 237 may perform edge strength $K_G$-mixing ratio $K_E$ conversion using a nonlinear function.

Therefore, the mixing ratio calculation unit 237 calculates the mixing ratio $K_E$ for each pixel of interest from the edge strength $K_G$ calculated for each pixel of interest of an input image. Furthermore, the mixing ratio calculation unit 237 outputs, to the mixing unit 21, the mixing ratio $K_E$ for each pixel of interest of an input image.

The mixing unit 21 receives, from the variance calculation unit 233, the average value AA, a moving average, for each pixel of interest of an input image, and, from the mixing ratio calculation unit 237, the mixing ratio $K_E$ for each pixel of interest of an input image. The mixing ratio 21 mixes the brightness intensity of a pixel of interest with the average value AA of the pixel of interest based on the mixing ratio $K_E$ of the pixel of interest to calculate the illumination light component LL for the pixel of interest, where each pixel of the input image II is sequentially processed as the pixel of interest.

Here, letting the coordinates of a pixel of interest be (x, y), and the average value of the pixel of interest be A(x, y), the illumination light component L(x, y) of the pixel of interest is calculated from the mixing ratio $K_E$ from Equation (27) below:

$$L(x,y) = (1-K_E) \cdot I(x,y) + K_E \cdot A(x,y). \quad (27)$$

Figure 19:
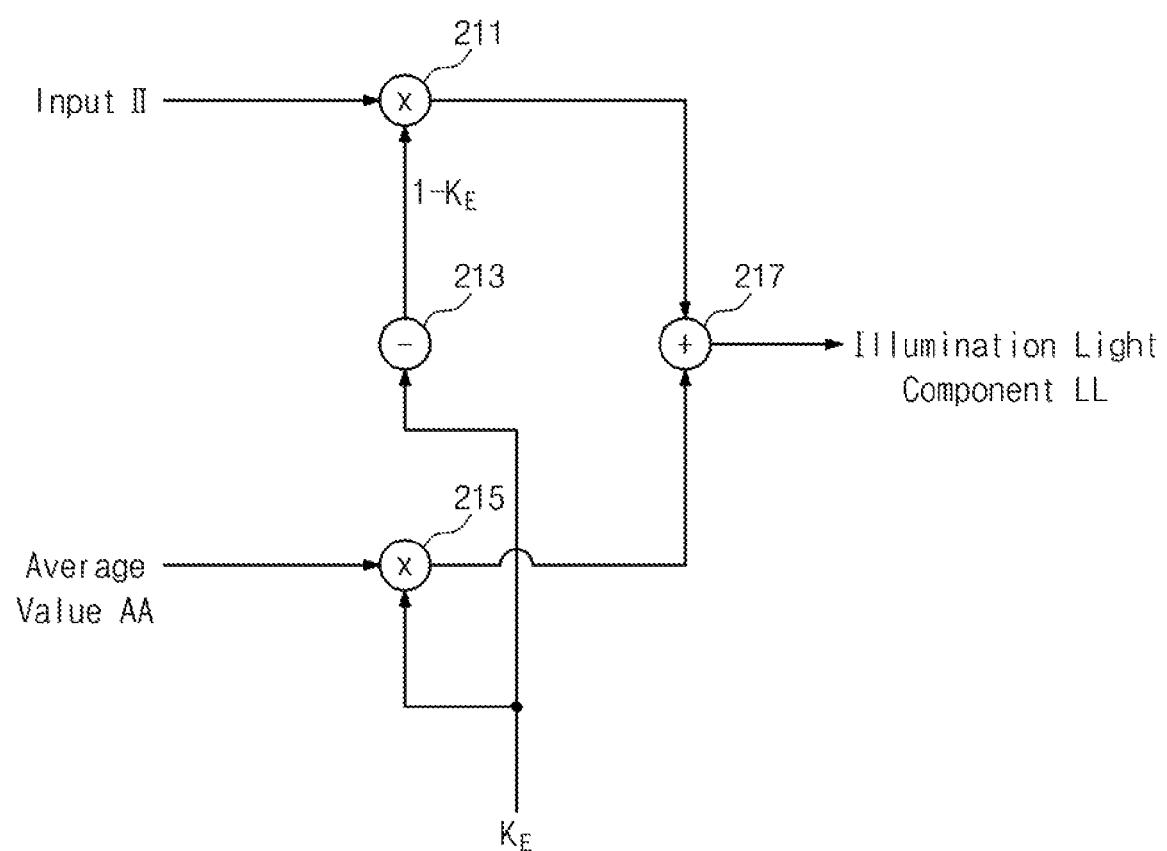
FIG. 19 illustrates a schematic configuration of a mixing unit.

FIG. 19 illustrates an exemplary configuration of the mixing unit 21 for calculating the illumination light component L(x, y) from Equation (27).

As illustrated in FIG. 19, the mixing unit 21 includes, for example, multiplication units 211 and 215, a subtraction unit 213, and an addition unit 217.

The subtraction unit 213 receives, from the mixing ratio calculation unit 237, the mixing ratio $K_E$ corresponding to the pixel of interest (x, y), and outputs a difference of 1 and the mixing ratio $K_E$, i.e., $1-K_E$, to the multiplication unit 211.

The multiplication unit 211 multiplies the brightness component I(x, y) of the pixel of interest of an input image by the difference $1-K_E$ received from the subtraction unit 213, and outputs the product to the addition unit 217. The multiplication unit 211 is an example of a first multiplication unit, and the difference $1-K_E$ multiplied by the brightness component I(x, y) is an example of a first coefficient.

The multiplication unit 215 multiplies the average value A(x, y) of the pixel of interest (x, y) received from the variance calculation unit 233 by the mixing ratio $K_E$ of the pixel of interest (x, y) received from the mixing ratio calculation unit 237, and outputs the product to the addition unit 217. The multiplication unit 215 is an example of a second multiplication unit, and the mixing ratio $K_E$ multiplied by the average value A(x, y) is an example of a second coefficient.

The addition unit 217 adds the product received from the multiplication unit 211 (i.e., $(1-K_E) \times I(x, y)$) to the product received from the multiplication unit 215 (i.e., $K_E \times A(x, y)$), and outputs the sun expressed in Equation (27) as the illumination light component L(x, y) corresponding to the pixel of interest (x, y).

3.3. Processing

Figure 20:
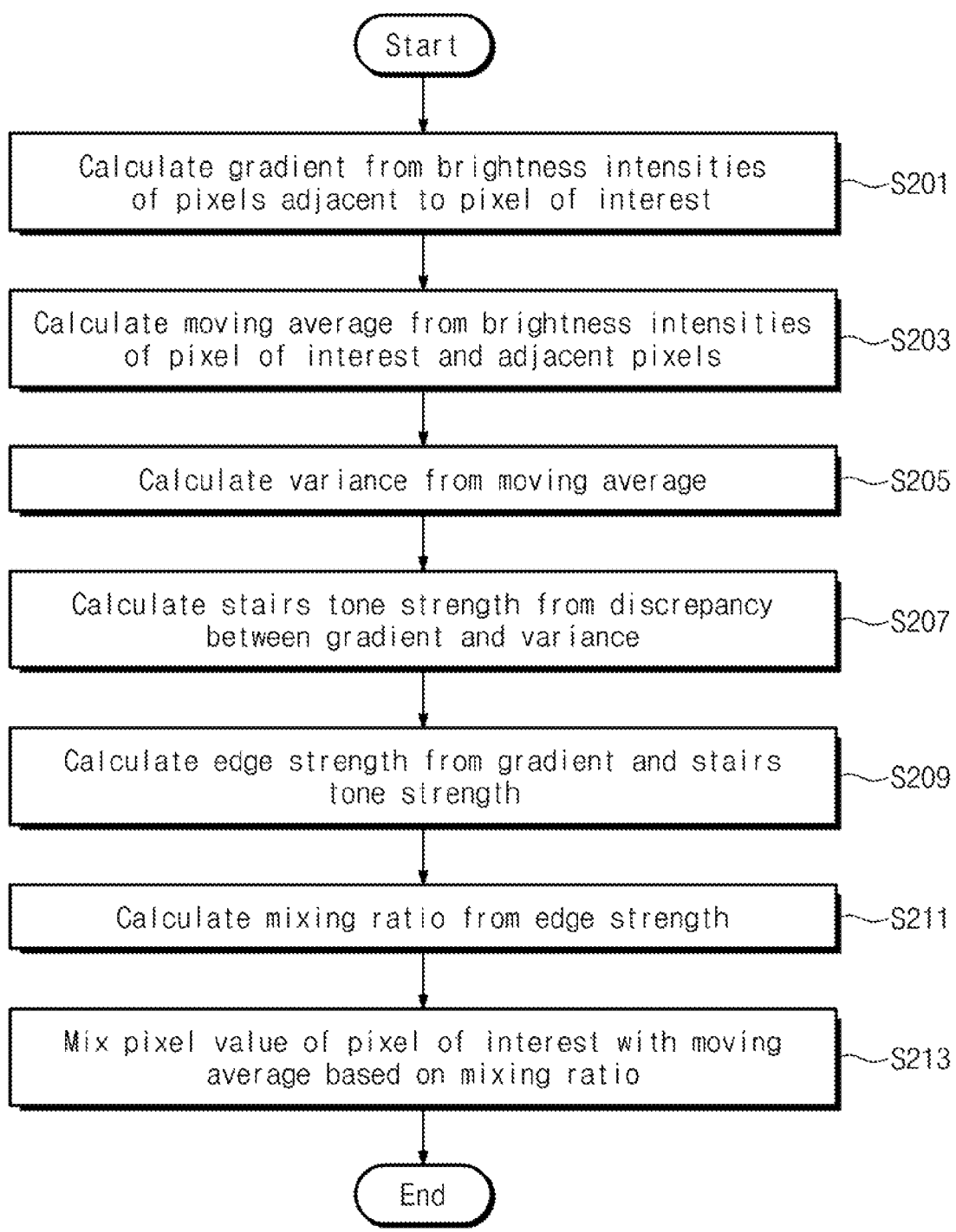
FIG. 20 is a flowchart of an operation method of an illumination light generation unit according to an embodiment.

An exemplary method of operating the illumination light generation unit 20 according to a present embodiment will be described with reference to FIG. 20. FIG. 20 is a flowchart that illustrates a method of operating the illumination light generation unit 20 according to a present embodiment.

Operation S201

The gradient calculation unit 231 calculates the gradient $\nabla^2$ for each pixel of interest from the brightness intensities of pixels adjacent to the pixel of interest using the gradient operator W, where each pixel of the input image is II sequentially processes as the pixel of interest. For example, the gradient calculation unit 231 can calculate the gradient $\nabla^2$ for each pixel of interest by calculating a convolution integral using the gradient operator W as expressed by Equations (19) to (21). Furthermore, the gradient calculation unit 231 outputs, to the edge strength calculation unit 235, the gradient $\nabla^2$ for each pixel of interest.

Operation S203

The variance calculation unit 233 calculates, for each pixel of interest, the average value AA of the brightness intensities of the pixel of interest and of pixels adjacent to the pixel of interest, where each pixel of the input image II is sequentially processed as the pixel of interest. The average value AA can be calculated from Equation (22). Furthermore, the variance calculation unit 233 outputs, to the mixing unit 21, the average value AA, i.e., a moving average, calculated for each pixel of interest.

Operation S205

The variance calculation unit 233 calculates the variance $\sigma^2$ of the pixel of interest from the average value AA calculated for each pixel of interest. The variance $\sigma^2$ can be calculated from Equation (23). Furthermore, the variance calculation unit 233 outputs, to the edge strength calculation unit 235, the variance $\sigma^2$ for each pixel of interest.

Operation S207

The edge strength calculation unit 235 receives, from the gradient calculation unit 231, the gradient $\nabla^2$ for each pixel of interest. Furthermore, the edge strength calculation unit 235 receives, from the variance calculation unit 233, the variance $\sigma^2$ for each pixel of interest. The edge strength calculation unit 235 calculates the discrepancy between the gradient $\nabla^2$ and the variance $\sigma^2$ as the stairs tone strength $K_S$. The stairs tone strength $K_S$ may be calculated from Equation (24).

Operation S209

Thereafter, the edge strength unit 235 calculates, for each pixel of interest of an input image II, the edge strength $K_G$ for a pattern tone edge by multiplying the gradient $\nabla^2$ of the pixel of interest by the stairs tone strength $K_S$ of the pixel of interest. The edge strength $K_G$ may be calculated from Equation (25). The edge strength calculation unit 235 outputs, to the mixing ratio calculation unit 237, the edge strength $K_G$ for each pixel of interest.

Operation S211

The mixing ratio calculation unit 237 receives, from the edge strength calculation unit 235, the edge strength $K_G$ of each pixel of interest of an input image. The mixing ratio calculation unit 237 converts the edge strength $K_G$ acquired for each pixel of interest into the mixing ratio $K_E$ a preset conversion function $f_E(K_G)$, such as that expressed by Equation (26). Furthermore, the mixing ratio calculation unit 237 outputs, to the mixing unit 21, the mixing ratio $K_E$ calculated for each pixel of interest of an input image.

Operation S213

The mixing unit 21 receives, from the variance calculation unit 233, the average value AA, i.e., a moving average, of each pixel of interest of an input image. Furthermore, the mixing unit 21 receives, from the mixing ratio calculation unit 237, the mixing ratio $K_E$ of each pixel of interest of an input image. The mixing ratio 21 combines the brightness intensity of a pixel of interest with the average value AA of the pixel of interest based on the mixing ratio $K_E$ of the pixel of interest to calculate the illumination light component LL of the pixel of interest, where each pixel of the input image II is sequentially processed as the pixel of interest. The illumination light component LL can be calculated from Equation (27).

The above-mentioned series of operations can be performed by a program that processes each element of the display device 10 and executes on a CPU. This program may be configured to be executed by an OS installed in the device. A storage location of the program is not limited as long as it is readable by a device that includes a CPU for performing the above-described processing. For example, the program may be stored in an external recording medium accessible from the device. In this case, the recording medium in which the program is stored may be accessed by the device so that the CPU of the device can execute the program.

3.4. Example

An example of an estimated circuit size of the illumination light generation unit 20 according to a present embodiment will be described. An example of the estimated circuit size of the illumination light generation unit 10', i.e., comparative example 1, described above with reference to FIG. 3 and an example of the estimated circuit size of the illumination light generation unit 10, i.e., comparative example 2, according to an embodiment described above with reference to FIG. 7 will also be described. In a present description, the circuit size may be estimated based on the number of gates in a gate circuit. For example, estimated circuit size reference values are "104" for an adder and a subtracter, "384" for a multiplier, "1600" for a divider, "64" for an absolute value calculation circuit, and "40" for a 2-input selector.

Figure 21:
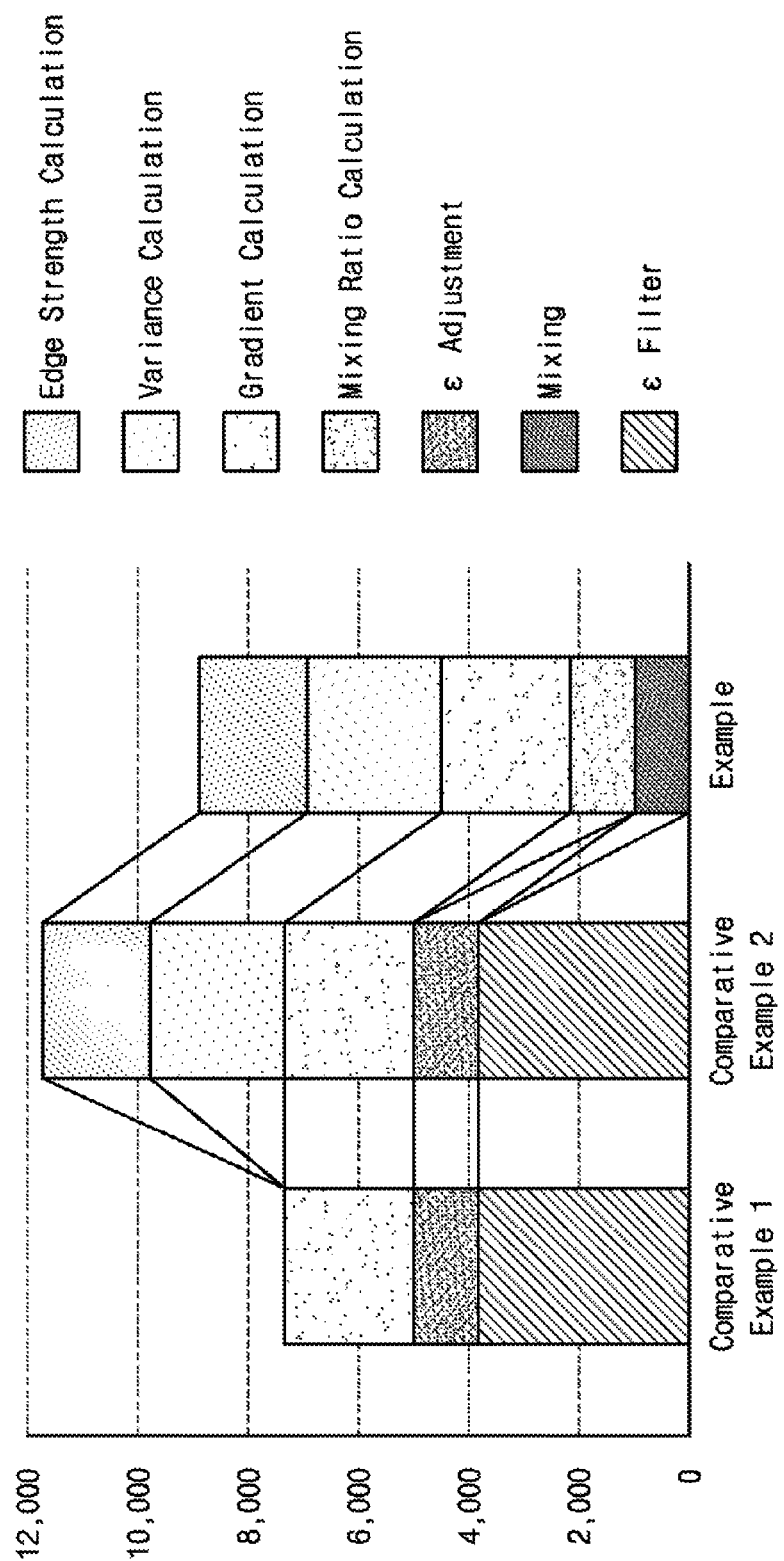
FIG. 21 is a diagram that illustrates an estimated circuit size of an exemplary illumination light generation unit according to an embodiment of the inventive concept.

FIG. 21 is a diagram that illustrates an estimated circuit size of an exemplary illumination light generation unit according to a present embodiment and the estimated circuit sizes of illumination light generation units according to comparative examples 1 and 2.

As illustrated in FIG. 21, an illumination light generation unit of comparative example 1 includes an ∈ filter, an ∈ value adjusting unit, and a gradient calculation unit, and the ∈ filter has a largest circuit size, about 3800. Compared to an illumination light generation unit of comparative example 1, an illumination light generation unit of comparative example 2 further includes a variance calculation unit and an edge strength calculation unit, and has a circuit size larger than that of an illumination light generation unit of comparative example 1 due to the circuit sizes of the additional elements.

The ∈ filter and the ∈ value adjusting unit of an illumination light generation unit of comparative example 2 are replaced with a mixing unit and a mixing ratio calculation unit in an illumination light generation unit of an example illustrated in FIG. 16. The ∈ value adjusting unit is approximately equivalent to the mixing ratio calculation unit in terms of a circuit size, but the circuit size of the mixing unit, see FIG. 19 for example, is about 800, less than that of the ∈ filter.

Therefore, an illumination light generation unit according to an example can enable a reduced circuit size compared to a illumination light generation unit of comparative example 2. In detail, on the basis of the circuit size of an illumination light generation unit of comparative example 1, the circuit size of the illumination light generation unit of comparative example 2 increases by about 60%, but the circuit size of an illumination light generation unit of an example increases by about 20%. As described above, like an illumination light generation unit 10 of a comparative example 2 according to an embodiment of FIG. 7, an illumination light generation unit 20 of an example according to an embodiment of FIG. 16 can differentiate a stairs tone edge from a pattern tone edge in an input image, thereby enabling nonlinear smoothing processing for the input image.

3.5. Summary

As described above, the illumination light generation unit 20 according to an embodiment of the inventive concept calculates the gradient $\nabla^2$ and the variance $\sigma^2$ for each pixel of interest, and calculates the stairs tone strength $K_S$ from the discrepancy between the gradient $\nabla^2$ and the variance $\sigma^2$. The illumination light generation unit 20 calculates the edge strength $K_G$ from the stairs tone strength $K_S$, and calculates the mixing ratio $K_E$ from the edge strength $K_G$. Furthermore, the illumination light generation unit 20 mixes the brightness intensity of a pixel of interest with the average value AA, which is a moving average, of the brightness intensities of the pixel of interest and the pixels adjacent to the pixel of interest based on the mixing ratio $K_E$, to generate the illumination light component LL.

By virtue of a configuration according to an embodiment of the inventive concept, like the illumination light generation unit 10 according to an embodiment of FIG. 7, the illumination light generation unit 20 according to a present embodiment can differentiate a stairs tone edge from a pattern tone edge in an input image, thereby enabling nonlinear smoothing processing for the input image.

Furthermore, in the illumination light generation unit 20 according to a present embodiment, a relatively large circuit, such as an ∈ filter, can be replaced with a smaller circuit, such as the mixing unit 21. Accordingly, the illumination light generation unit 20 according to a present embodiment can reduce a circuit size compared to the illumination light generation unit 10 according to an embodiment.

In particular, a change in the illumination light component is small and substantially linear within a reference pixel range of the operator length n=5 i of a high resolution device, such as a high definition (HD), full high definition (FHD), ultra high definition (UHD), etc. Therefore, on the basis of such characteristics, the illumination light generation unit 20 according to a present embodiment calculates the illumination light component LL using a moving average value AA of the brightness intensities II of pixels within a predetermined reference pixel range based on a pixel of interest, so that the circuit size may be reduced.

Moreover, the illumination light generation unit 20 according to a present embodiment reuses the average value AA calculated during derivation of the variance $\sigma^2$, to calculate the illumination light component LL from the mixing ratio $K_E$. Therefore, since a newly calculated average value is not used to calculate the illumination light component LL, the circuit size may be further reduced.

As described above, embodiments of the inventive concept provide an image processing device, an image processing method, and a program for differentiating a stairs tone edge from a pattern tone edge in an image to perform a nonlinear smoothing operation on the image.

The above-disclosed subject matter is to be considered illustrative and not restrictive, and the appended claims are intended to cover all such modifications, enhancements, and other embodiments, which fall within the true spirit and scope of embodiments of the inventive concept. Thus, to the maximum extent allowed by law, the scope of embodiments of the inventive concept is to be determined by the broadest permissible interpretation of the following claims and their equivalents, and shall not be restricted or limited by the foregoing detailed description.

What is claimed is:

1. An image processing device comprising:
    an edge strength calculation unit that calculates an edge strength of a pixel of interest in an input image from a stairs tone strength of the pixel of interest and a gradient of the pixel of interest, wherein the gradient is calculated from pixel values of the pixel of interest and pixels adjacent to the pixel of interest, and the stairs tone strength is indicative of differences between the gradient and a variance of the pixel of interest calculated from the pixel values of the pixel of interest and the adjacent pixels; and
    a mixing unit that calculates an illumination light component of the pixel of interest of the input image from the pixel value of the pixel of interest, an average value of the pixel values of the pixels adjacent to the pixel of interest, and a mixing ratio of the pixel of interest calculated from the edge strength.

2. The image processing device of claim 1, further comprising:
    a variance calculation unit that calculates the average value from the pixel values of the of the pixel of interest and adjacent pixels within a predetermined range of the pixel of interest, and calculates the variance from the average value.

3. The image processing device of claim 1, further comprising:
    a gradient calculation unit that calculates the gradient of the pixel of interest from pixel values of the pixel of interest and adjacent pixels within a predetermined range of the pixel of interest.

4. The image processing device of claim 1, further comprising:
a mixing ratio calculation unit that calculates the mixing ratio of the pixel of interest from the edge strength of the pixel of interest.

5. The image processing device of claim 4, wherein the mixing ratio $K_E$ is calculated from $$f_E(K_G) = \begin{cases} 1 & \ldots K_G < th_1 \\ \min & \ldots K_G \geq th_2 \\ \frac{(1-\min)(th_2 - K_G)}{th_2 - th_1} + \min & \ldots \text{otherwise} \end{cases},$$

wherein $K_G$ is the edge strength, $f_E(K_G)$ is a function that converts the edge strength $K_G$ into the mixing ratio $K_E$, $th_1$ and $th_2$ are threshold values of the edge strength, wherein $th_1 < th_2$, and min is a preset constant greater than zero.

6. The image processing device of claim 1, wherein the stairs tone strength $K_S$ (x, y) of the pixel of interest is calculated from $$K_S(x, y) = \begin{cases} \nabla^2(x, y)/\sigma^2(x, y) & \ldots \nabla^2(x, y)/\sigma^2(x, y) \leq 1 \\ 1 & \ldots \text{otherwise} \end{cases},$$

wherein $\nabla^2(x, y)$ is the gradient of the pixel of interest, and $\sigma^2(x, y)$ is the variance of the pixel of interest, and the edge strength $K_G(x, y)$ of the pixel of interest is calculated from $$K_G(x,y) = \alpha \cdot \nabla^2(x,y) \cdot K_S,$$

wherein $\alpha$ is a predetermined constant.

7. The image processing device of claim 1, wherein the mixing unit comprises:
a first multiplication unit that multiplies the pixel value of the pixel of interest by a first coefficient based on the mixing ratio;
a second multiplication unit that multiplies the average value by a second coefficient based on the mixing ratio;
a subtraction unit that that calculates that first coefficient by subtracting the mixing ratio from one; and
an addition unit that adds an output of the first multiplication unit to an output of the second multiplication unit.

8. The image processing device of claim 1, further comprising:
a division unit that receives the illumination light component from the illumination light generation unit and that calculates a reflectivity component of the input image by dividing the input image by the illumination light component;
an illumination light modulation unit that locally modulates the illumination light component to generate a new illumination light component; and
a multiplication unit that multiplies the reflectivity component received from the division unit by the new illumination light component received from the illumination light modulation unit to generate a brightness component.

9. A method of processing an image, comprising the steps of:
calculating an edge strength of a pixel of interest in an input image from a stairs tone strength of the pixel of interest and a gradient of the pixel of interest, wherein the gradient is calculated from pixel values of the pixel of interest and pixels adjacent to the pixel of interest, and the stairs tone strength is indicative of differences between the gradient and a variance of the pixel of interest calculated from the pixel values of the pixel of interest and the adjacent pixels; and
calculating an illumination light component of the pixel of interest of the input image from the pixel value of the pixel of interest, an average value of the pixel values of the pixels adjacent to the pixel of interest, and a mixing ratio of the pixel of interest calculated from the edge strength.

10. The method of claim 9, wherein the average value is calculated from the pixel values of the pixel of interest and adjacent pixels within a predetermined range of the pixel of interest, and the variance is calculated from the average value.

11. The method of claim 9, wherein the gradient is calculated from pixel values of the pixel of interest and adjacent pixels within a predetermined range of the pixel of interest.

12. The method of claim 9, wherein the mixing ratio $K_E$ of the pixel of interest is calculated from the edge strength of the pixel of interest using $$f_E(K_G) = \begin{cases} 1 & \ldots K_G < th_1 \\ \min & \ldots K_G \geq th_2 \\ \frac{(1-\min)(th_2 - K_G)}{th_2 - th_1} + \min & \ldots \text{otherwise} \end{cases},$$

wherein $K_G$ is the edge strength, $f_E(K_G)$ is a function that converts the edge strength $K_G$ into the mixing ratio $K_E$, $th_1$ and $th_2$ are threshold values of the edge strength, wherein $th_1 < th_2$, and min is a preset constant greater than zero.

13. The method of claim 9, wherein the stairs tone strength $K_S$ (x, y) of the pixel of interest is calculated from $$K_S(x, y) = \begin{cases} \nabla^2(x, y)/\sigma^2(x, y) & \ldots \nabla^2(x, y)/\sigma^2(x, y) \leq 1 \\ 1 & \ldots \text{otherwise} \end{cases},$$

wherein $\nabla^2(x, y)$ is the gradient of the pixel of interest, and $\sigma^2(x, y)$ is the variance of the pixel of interest, and the edge strength $K_G(x, y)$ of the pixel of interest is calculated from $$K_G(x,y) = \alpha \cdot \nabla^2(x,y) \cdot K_S,$$

wherein $\alpha$ is a predetermined constant.

14. The method of claim 9, wherein the illumination light component L(x, y) of the pixel of interest is calculated from $$L(x,y) = (1 - K_E) \cdot I(x,y) + K_E \cdot A(x,y),$$

wherein $K_E$ is the mixing ratio, I(x, y) is the pixel value of the input image at the pixel of interest, and A(x, y) is the average value of the pixel of interest.

15. A non-transitory program storage device readable by a computer, tangibly embodying a program of instructions executed by the computer to perform the method steps for processing an image, the method comprising the steps of
calculating an edge strength of a pixel of interest in an input image from a stairs tone strength of the pixel of interest and a gradient of the pixel of interest, wherein the gradient is calculated from pixel values of the pixel of interest and pixels adjacent to the pixel of interest, and the stairs tone strength is indicative of differences between the gradient and a variance of the pixel of interest calculated from the pixel values of the pixel of interest and the adjacent pixels; and calculating an illumination light component of the pixel of interest of the input image from the pixel value of the pixel of interest, an average value of the pixel values of the pixels adjacent to the pixel of interest, and a mixing ratio of the pixel of interest calculated from the edge strength.

16. The computer-readable storage device of claim 15, wherein the average value is calculated from the pixel values of the pixel of interest and adjacent pixels within a predetermined range of the pixel of interest, and the variance is calculated from the average value.

17. The computer-readable storage device of claim 15, wherein the gradient is calculated from pixel values of the pixel of interest and adjacent pixels within a predetermined range of the pixel of interest.

18. The computer-readable storage device of claim 15, wherein the mixing ratio $K_E$ of the pixel of interest is calculated from the edge strength of the pixel of interest using $$f_E(K_G) = \begin{cases} 1 & \ldots K_G < th_1 \\ \min & \ldots K_G \geq th_2 \\ \frac{(1-\min)(th_2 - K_G)}{th_2 - th_1} + \min & \ldots \text{otherwise} \end{cases},$$

wherein $K_G$ is the edge strength, $f_E(K_G)$ is a function that converts the edge strength $K_G$ into the mixing ratio $K_E$, $th_1$ and $th_2$ are threshold values of the edge strength, wherein $th_1 < th_2$, and min is a preset constant greater than zero.

19. The computer-readable storage device of claim 15, wherein the stairs tone strength $K_S(x, y)$ of the pixel of interest is calculated from $$K_S(x, y) = \begin{cases} \nabla^2(x, y)/\sigma^2(x, y) & \ldots \nabla^2(x, y)/\sigma^2(x, y) \leq 1 \\ 1 & \ldots \text{otherwise} \end{cases},$$

wherein $\nabla^2(x, y)$ is the gradient of the pixel of interest, and $\sigma^2(x, y)$ is the variance of the pixel of interest, and the edge strength $K_G(x, y)$ of the pixel of interest is calculated from $$K_G(x,y) = \alpha \cdot \nabla^2(x,y) \cdot K_S,$$

wherein $\alpha$ is a predetermined constant.

20. The computer-readable storage device of claim 15, wherein the illumination light component $L(x, y)$ of the pixel of interest is calculated from $$L(x,y) = (1-K_E) \cdot I(x,y) + K_E \cdot A(x,y),$$

wherein $K_E$ is the mixing ratio, $I(x, y)$ is the pixel value of the input image at the pixel of interest, and $A(x, y)$ is the average value of the pixel of interest.

* * * * *